United States Patent [19]

Hemdal

[11] Patent Number: 4,922,415
[45] Date of Patent: May 1, 1990

[54] DATA PROCESSING SYSTEM FOR CONVERTING VIRTUAL TO REAL ADDRESSES WITHOUT REQUIRING INSTRUCTION FROM THE CENTRAL PROCESSING UNIT

[76] Inventor: Goran A. H. Hemdal, 10 Sabha Court, Parkland Grove, Ashford, Middlesex, United Kingdom, TW15 2JN

[21] Appl. No.: 798,891

[22] PCT Filed: Mar. 1, 1985

[86] PCT No.: PCT/GB85/00084
§ 371 Date: Dec. 11, 1985
§ 102(e) Date: Dec. 11, 1985

[87] PCT Pub. No.: WO85/04031
PCT Pub. Date: Sep. 12, 1985

[30] Foreign Application Priority Data
Mar. 2, 1984 [GB] United Kingdom ............... 8405491

[51] Int. Cl.$^5$ .................. G06F 12/10; G06F 13/00
[52] U.S. Cl. .................... 364/200; 364/955; 364/255.1
[58] Field of Search ... 364/200 MS File, 900 MS File

[56] References Cited

U.S. PATENT DOCUMENTS

| | | | |
|---|---|---|---|
| 3,723,976 | 3/1973 | Alvarez et al. | 364/200 |
| 4,285,040 | 8/1981 | Carlson et al. | 364/200 |
| 4,385,352 | 5/1983 | Bienvenu | 364/200 |
| 4,442,484 | 4/1984 | Childs et al. | 364/200 |
| 4,482,952 | 11/1984 | Akagi | 364/200 |
| 4,682,281 | 7/1987 | Woffinden et al. | 364/200 |
| 4,682,281 | 7/1987 | Woffinden et al. | 364/200 |
| 4,792,897 | 12/1988 | Gotou et al. | 364/200 |
| 4,812,969 | 3/1989 | Takagi et al. | 364/200 |

FOREIGN PATENT DOCUMENTS
1188436 4/1970 United Kingdom .

Primary Examiner—Archie E. Williams, Jr.
Assistant Examiner—Ayni Mohamed
Attorney, Agent, or Firm—Kenyon & Kenyon

[57] ABSTRACT

A computer system includes a central processing unit, a main memory unit and a master controller unit, which master controller interconnects the processing unit and the memory. The processing unit utilizes virtual addresses and generates virtual address to access the memory. However, the memory is accessed using real addresses. Thus, the master controller performs the required translating function for the interoperability of the processor and memory and does so without requiring instructions from the processor. This represents a significant decrease in processor overhead.

12 Claims, 21 Drawing Sheets

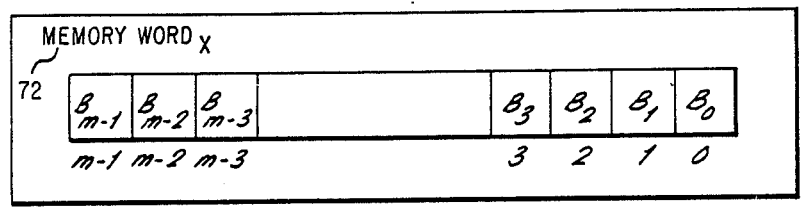
$$V_m = \sum_{i=0}^{m-1} B_i * 2^i$$
FIG. 2a.
| $B_3$ | $B_2$ | $B_1$ | $B_0$ | $V_4$ |
|---|---|---|---|---|
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |
FIG. 2b.
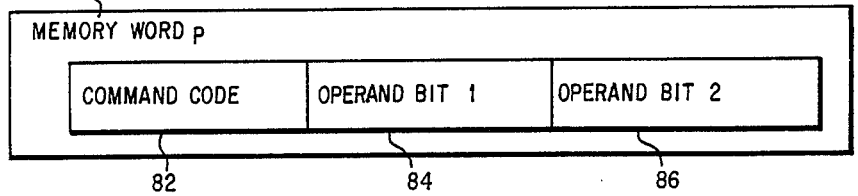
FIG. 3.

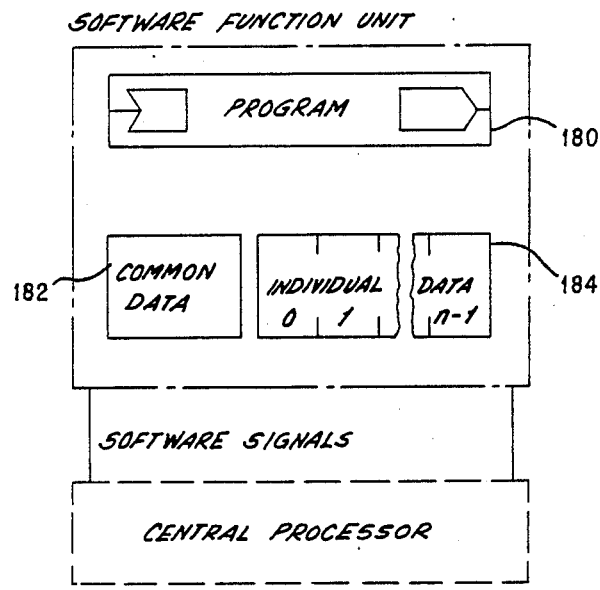
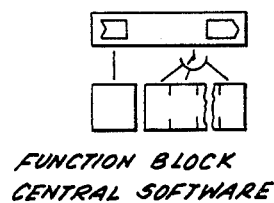
FIG. 12.

FIG. 20.

| | XRC 240 | BA 242 | SZ 244 | LL 246 | NOV 248 | |
|---|---|---|---|---|---|---|
| 0 | - | X + 0//0 | 8 | 0 | 60 | ← P |
| 1 | XR0 | 2 | 176 | 1 | 3 | ← Q(XR0).A |
| 2 | - | X + 1//0 | 16 | 0 | 1001 | |
| 3 | XR0 | 4 | 176 | 1 | 3 | ← Q(XR0).B |
| 4 | - | X + 2//0 | 8 | 0 | 101 | |
| 5 | XR0 | 6 | 176 | 1 | 3 | ← Q(XR0).C |
| 6 | - | X + 2//8 | 8 | 100 | 101 | |
| 7 | XR0 | 8 | 176 | 1 | 3 | ← Q(XR0).D(XR1) |
| 8 | XR1 | 9 | 4 | -3 | 3 | |
| 9 | - | X + 3//0 | 4 | 1 | 12 | |
| 10 | XR0 | 11 | 176 | 1 | 3 | ← Q(XR0).E(XR2,XR3) |
| 11 | XR2 | 12 | 4 | 1 | 24 | |
| 12 | XR3 | 13 | 1 | 3 | 3 | |
| 13 | - | X + 4//0 | 1 | 0 | 2 | |
| 14 | XR0 | 15 | 176 | 1 | 3 | ← Q(XR0).F |
| 15 | - | X +10//0 | 32 | -500000 | 1000001 | |
| 16 | XR1 | 17 | 8 | 1 | 3 | ← R(XR1) |
| 17 | - | X + 3//0 | 8 | 0 | 101 | |

FIG. 21.

| Addr | 15 14 13 12 11 10 9 8 | 7 6 5 4 3 2 1 0 |
|---|---|---|
| X+0 | //////// | P |
| X+1 | Q(1).A | |
| X+2 | Q(2).A | |
| X+3 | Q(3).A | |
| X+4 | Q(2).B | Q(1).B |
| X+5 | Q(1).C | Q(3).B |
| X+6 | Q(3).C | Q(2).C |
| X+7 | //// Q(1).D(-1) | Q(1).D(-2) Q(1).D(-3) |
| X+8 | //// Q(2).D(-1) | Q(2).D(-2) Q(2).D(-3) |
| X+9 | //// Q(3).D(-1) | Q(3).D(-2) Q(3).D(-3) |
| X+10 | | ← Q(1).E(1.3) |
| X+11 | | |
| X+15 | Q(2).E(24) ↘ | |
| X+16 | | ← Q(2).E(1.3) |
| X+27 | Q(3).E(24) ↘ | |
| X+28 / X+29 | Q(1).F | |
| X+30 / X+31 | Q(2).F | |
| X+32 / X+33 | Q(3).F | |
| X+34 | R(2) | R(1) |
| X+35 | //////// | R(3) |

FIG. 22.

| | XRC 240 | BA 242 | 244 SZ | LL 246 | NOV 248 | |
|---|---|---|---|---|---|---|
| 0 | — | x+0//0 | 8 | 0 | 60 | ← P |
| 1 | XR0 | 2 | 16 | 1 | 3 | ← Q(XR0).A |
| 2 | — | x+1//0 | 16 | 0 | 1001 | |
| 3 | XR0 | 4 | 8 | 1 | 3 | ← Q(XR0).B |
| 4 | — | x+4//0 | 8 | 0 | 101 | |
| 5 | XR0 | 6 | 8 | 1 | 3 | ← Q(XR0).C |
| 6 | — | x+5//8 | 8 | 100 | 101 | |
| 7 | XR0 | 8 | 16 | 1 | 3 | ← Q(XR0).D(XR1) |
| 8 | XR1 | 9 | 4 | −3 | 3 | |
| 9 | — | x+7//0 | 4 | 1 | 12 | |
| 10 | XR0 | 11 | 96 | 1 | 3 | ← Q(XR0).E(XR2,XR3) |
| 11 | XR2 | 12 | 4 | 1 | 24 | |
| 12 | XR3 | 13 | 1 | 3 | 3 | |
| 13 | — | x+10//0 | 1 | 0 | 2 | |
| 14 | XR0 | 15 | 32 | 1 | 3 | ← Q(XR0).F |
| 15 | — | x+28//0 | 32 | −500000 | 1000001 | |
| 16 | XR1 | 17 | 8 | 1 | 3 | ← R(XR1) |
| 17 | — | x+3//0 | 8 | 0 | 101 | |

DATA PROCESSING SYSTEM FOR CONVERTING VIRTUAL TO REAL ADDRESSES WITHOUT REQUIRING INSTRUCTION FROM THE CENTRAL PROCESSING UNIT

BACKGROUND OF THE INVENTION

1. Field of the Invention

This invention relates to computers and is particularly concerned with the performance and reliability of computer systems including a standard CPU, such as the Motorola MC 68000, INTEL iAPX 286, etc., and the memory accessed from such CPUs. The invention allows machine instructions of a standard CPU to be utilized in a much more efficient and reliable way than is otherwise possible.

There now follows a general description of the technical background to the invention followed by a detailed description of some specific embodiments of the invention with references to the accompanying drawings.

2. Background of the Invention

FIG. 1 shows a simplified block diagram of a computing system. This system is not the subject of the invention, but introduced in order to be able to explain the background to, and the salient points of, the invention. The main parts of the computing system in FIG. 1 are the Central Processing Unit (CPU) 10, the Memory (M) 40, and the Input/Output Interface (IO) 60 to the external world. The CPU contains a Control Logic function (CL) 12, which is not described in detail, and four registers; a Program Counter register (PC) 14, an Address Register (AR) 16, a Data Register (DR) 18 and an Instruction Register (IR) 20. The information stored in these registers can be read and written by CL 12. The memory (M) 40 contains N memory words (MW$_0$, MW$_1$, ... MW$_{N-1}$), and an Address Decoder (AD) 42, the input of which is connected to the Program Counter (PC) 14 and the Address Register (AR) 16 of the CPU 10. Each memory word contains a specific number of binary memory elements, each one of which may store either 0 to 1. All the memory words are connected to the Data Register (DR) 18 of the CPU 10, i.e. the contents of any memory word may be transferred to DR 18 and vice versa. The Control Logic (CL) 12 of the CPU has two control outlets, a Read Outlet (R) 22 and a Write Outlet (W) 24, which are connected to all the memory words in parallel. When CL 12 issue a Read command, the Address Decoder (AD) 42 selects the Memory Word, which corresponds to the contents of the Address Register (AR) 16 or the Program Counter (PC) 14, and the R Control Outlet 22 from CL 12 enables the transfer of information from the selected memory word into the Data Register (DR) 18 if the address is obtained from the Address Register (AR) 16, and into the Instruction Register (R) 20 if the address is obtained from the Program Counter (PC) 14. If a Write Command is issued, the W Control Outlet 24 from CL 12 enables the transfer of information from the Data Register (DR) 18 into the memory word addressed by the Address Register (AR) 16.

The information stored in the memory words can be used in two different ways, either as data or as control instructions.

When the information stored in a memory word is used as data, the separate binary memory elements are combined together to form a single value ($V_m$) 70 according to the principle shown in FIG. 2a. This value can then be manipulated by the CL 12 in the desired manner, e.g. arithmetic operations, logic operations, etc. For a memory word MX$_x$ 72 containing m binary memory elements or bits, the total number of different data values represented by different combinations of the m bits, which can be stored in the memory word is $2^m$. These bit combinations may be used to represent values ranging from 0 to $2^m - 1$ as illustrated by the example of the possible values for a 4-bit memory word in FIG. 2b. In special cases (e.g. binary coded decimal values) the value range may be further restricted. It is to be noted, that the manipulation of data values in CL 12 will give the correct result only as long as the result values do not exceed the number of bits, which can be manipulated and stored. In a system with 4-bit memory words and 4-bit control logic the addition 8+8 would give the result 0 instead of 16, because the representation of 16 in a four bit system would be 0. It is also to be noted that the information may be coded so that the most significant bit is used as a sign bit with, for instance, positive values denoted by the value 0 and negative values by the value 1. The value range of a four bit variable would, in this case be −8 to +7, i.e. still 16 values. Other Coding schemes are, of course, also possible.

Memory words used for data storage purposes are usually randomly accessed, i.e. no implicit relationship exists between the address of one data word and another data word. In order to access a data word, the address of the word has to be transferred into the Address Register (AR) 16. Thereafter the contents of the word can be read into the Data Register (DR) 18, or the contents of the Data Register (DR) 18 can be stored into the memory word. It is to be noted that it is possible to build explicit relationships between data words. One possibility is the sequential array, i.e. a number of consecutive memory words, which contains related information and which can be accessed by setting the Address Register 16 to, for instance, the first word in the array and then incrementing the Address Register 16 to access consecutive words in the array. Another possibility is the chaining of data elements, i.e. storing the address of one memory word, as information, in another memory word. In order to access such an indirectly addressed memory word, the information from the first word is first read into the Data Register (DR) 18, and then via CL 12 transferred to the Address Register (AR) 16.

A program consists of a number of sequentially executed Machine Instructions. It is therefore natural, that the memory words used to store the Machine Instructions of a program also follow one another sequentially. The sequential execution of Machine Instructions stored in consecutive memory words is the normal mode of operation and therefore built into the Control Logic of the CPU 10. In order to access memory words containing Control Instructions the Program Counter (PC) 14 is used to select the memory word to be read. The information is then transferred to the Instruction Register (IR) 20, where CL 12 can access and evaluate the instruction. Each time a Machine Instruction is read from the memory, the Program Counter 14 is automatically incremented so that control instructions are read in consecutive order.

When a Machine Instruction has been read into the Instruction Register 20 the Control Logic (CL) 12 first decodes the instruction. Depending on how the decoding is performed the bits of an instruction form bit groups, where each bit group has a separate meaning (and may even overlap each other in some cases). FIG. 3 illustrates a simplified example of instruction decoding in a memory word $MW_p$ 80, where it has been assumed, that instructions contain three bit groups, a Command Code group (CC) 82 and two Operand bit groups (OP1) 84 and (OP2) 86. The Command Code determines the actual instruction to be executed and the operands specific parameters of that execution. It is for instance possible to give a memory address as OP1 and a data value as OP2 with the command code of the instruction specifying writing into memory (Store Data =SD instruction). The Control Logic (CL) 12 will then perform the following activities:

Transfer OPI 84 into the AR register 16 of FIG. 1.
Transfer OP2 86 into the DR register 18 of FIG. 1.
Assert the W control signal 24 to the memory M 40, whereby the information in DR 18 will be written into the memory word addressed by AR 16.
Increment the PC register 14 to prepare execution of the next instruction.

Another example is the case where OP1 18 gives a memory address and the command code specifies a 'jump' (JP instruction). In this case the control logic performs the single activity:

Transfer OPI 84 into the PC 14 register, thereby preparing for execution of the next instruction at the specified memory word.

The number of operands used in any particular instruction may vary with the instruction as already illustrated by the two examples above. Some instructions use no operands at all. Some instructions may even require three or four operands.

Gradually the general computer system structure in FIG. 4 has evolved, which structure is now taken for granted in practically all types of conventional computing systems. The hardware consists of the Central Processing Unit (CPU) 90 with its set of Machine Instructions (MI), the Memory (M) 100 and the interface to the external world (IO) 110. In FIG. 4 the Data Flow and Control Flow relationships are shown, where each such relationship assumes the existence of a hardware connection. The Memory (M) 100 is normally accessed by the CPU 90, but can also, if necessary, be accessed directly from the IO hardware 110 without the CPU 90 being involved. The software, which resides in the memory M 100, consists of the Application Programs (AP) 102, the Input/Output Interface Programs (IOP) 104, the Operating System (OS) 106 and the Data Base (DB) 108.

The Machine Instructions (MI) 92 consists of the set of instructions, which are executable within the CPU 90 and generally available for the design of any programs (OS 106, AP 102, IOP 104.

The Data Base (DB) 108 contains all of the data for the system, which data can be read and written by the CPU 90 under the control of the various programs.

The Interface Programs (IOP) 104 are a set of programs specifically designed to control the actual types of peripheral devices (IO) 110 used in the interworking with the external world. The Interface Programs are called either from the Master Scheduler (MS) 112 or from the Application Programs (AP) 102, and can themselves call Utility Subprograms.

The Application Programs (AP) 102 are a set of user specific programs, which have been designed to solve specific application problems (e.g. different types of computation). Application Programs are called from the Master Scheduler and may call Utility Subprograms and Interface Programs.

Finally, the Operating System is the application independent System Control Program, which contains two parts, the Master Scheduler (MS) 12, and the Utility Subprograms (US) 114. The Master Scheduler (MS) 112 is usually driven by means of Interrupt Signals (IS) 116, and controls the execution of all other programs in the entire system. The Utility Subprograms (US) 114 are a set of generally available subprograms, which have been developed to solve problems of a general nature, but which are too complex to be performed by means of single Machine Instructions. The Utility Subprograms can be called from any type of programs OS 106, AP 102 or IOP 104.

FIG. 5, wherein the same parts are given the same part numbers as in FIG. 4, shows a block diagram of the principal software structure, which is based on the hardware/software system structure in FIG. 4, and which is currently considered to be the basic software structure in conventional software technology. The software is split into two types of units, data and programs. The data of a system consist of individual data elements and structures (DE) 118 located in the Data Base (DB) 108 of the system. The programs consist of Operating System programs (OS) 106, Application Programs (AP) 102 and Input/Output Programs (IOP) 104. AP 102, IOP 104 and US 114 contain a set of programs (P), all of which are composed of Machine Instructions of the actual computer.

FIG. 6 shows an example of a typical layout of memory, which corresponds with the software structure in FIG. 5. Certain areas of the memory are dedicated to the Operating System with its programs, tables and other data areas, to which the user software have no access in principle. Other areas of the memory are dedicated to the exclusive storage of the Data Base, within which areas some subareas are dedicated exclusively to a particular user, some exclusively to another user, some dedicated to the exclusive use of several particular users and some areas being used by any and all program (including Operating System, IOP, Utility Subprograms etc.). Still other areas of the memories are used for programs of any type, some of which again are dedicated exclusively to a single user and some which are common for several users up to, and including, all users (common subprograms and common data).

A system which is implemented according to the principles shown in FIG. 6 will experience a number of problems, which are more or less interrelated. One of these problems is the administration and management of the user software.

As illustrated by FIG. 6 each user has a number of program and data areas, which belong to him, and a number of program and data areas, which do not belong to him, but which he nevertheless may use or access. When a new user software unit is to be introduced into an existing system, then space must be reserved for each of the areas which is exclusive for that software unit. Secondly it must be known whether any area used jointly with other software units is already in existence within the system. In that case that area needs to be linked to the rest of the areas accessible from that software unit. If no other software unit currently exists which needs the use of a jointly used area, then this area needs to be allocated before linking may be done. The reverse problem of course exists when a software unit is to be removed from a system, i.e. in this case the exclusive areas must be easily removed. However, any joint area may only be removed if no other user requiring this area exists.

Due to present technological limitations and the ever present requirement to be able to achieve higher performance with existing computers, one of the favored techniques for linking software areas together is by means of so-called 'pointers'. Pointers are nothing more than absolute memory addresses stored as data in the memory itself and may, as such, be simply and efficiently processed by the computer and stored in the memory of the computer, both as fixed relationships in the programs and as variable relationships in the data areas. FIG. 7 illustrates a representative example of possible pointer relationships for a single user. It is assumed that the Master Scheduler of the Operating System holds a master pointer to any User Program (exemplified by UPP1 130 in FIG. 7). The User Programs then contain further pointers to subprograms and data as required. The complexity of the problem of introducing software for any user into the system (and removing it from the system if and when required) now becomes apparent. In a system of the type illustrated in FIG. 7 the only realistic way of solving the problem is by means of an Off-Line Support system, which keeps track of all absolute addresses in order to be able to generate the actual binary code to be stored as programs and data in the memory. This of course makes any run-time changes or modification of the software extremely difficult. Emergency procedures for this purpose (so called 'patching' procedures) have been developed, but these cannot be considered to be satisfactory.

A second problem caused by the use of pointers is the reliability of the system. Correct operation of any software system postulates a) that all the pointers are correctly calculated and b) that they remain so. FIG. 8 shows an example of a user data structure in a memory pointers are used. This user data structure is implemented as two separate rows of memory words, the first row containing the three logical data elements C1 132 located at memory address 35492, P1 134 located at memory address 35493 and X 136 located at memory address 35494, and the second row containing the five logical data elements C2 138, C3 140, P2 142, P3 144 and Y 146 located at the memory addresses 48373, 48374, 48375, 48376 and 48377, respectively. Each of the data element is used for a particular purpose, which often is reflected in the logical name, which is associated with the data element, e.g. C1 132, C2 138, and C3 140 for elements used as counters; pl 134, P2 142, and P3 144 for elements used as pointers, X 136 and Y 146 for general purpose data elements. In FIG. 8 the two disjoint memory areas are shown to be linked via the two pointers P1 134 and P2 142, where P1 contains the address to the first memory word of the second memory area (48373) 138 and P2 in turn contains the address to the first word of the first memory area (35492) 132. Assuming that an externally obtained pointer indicates one of the memory areas, then all of the memory words will be accessible by means of the suitable logic. This will be illustrated by means of the following example, where it is assumed that the following logic operations are to be performed in the indicated sequence:

| C1: = C1 + 1 | Increment counter C1 |
| C2: = C2 + 1 | Increment counter C2 |
| C3: = C3 + 1 | Increment counter C3 |
| Y: = X | Transfer the contents of X to Y |

Assuming that the Address Register (AR) 16 in FIG. 1 has been set up to hold the address 35492 132 (=the External Pointer of FIG. 8) prior to the execution of the program, and that the program itself resides at some addresses A, A+1, A+2, etc. in the memory, then the logic operations may be performed by a sequence of machine instructions:

| A | ADD | @AR,1 | Increment C1 |
| A+1 | LD | AR,@AR +1 | Transfer P1 to AR |
| A+2 | ADD | @AR,1 | Increment C2 |
| A+3 | ADD | @AR +1,1 | Increment C3 |
| A+4 | LD | AR,@AR +2 | Transfer P2 to AR |
| A+5 | LD | DR,@AR +2 | Transfer X to DR |
| A+6 | LD | AR,@AR +1 | Transfer P1 to AR |
| A+7 | SD | DR,@AR +4 | Store DR in Y |

The above program sequence is perfectly valid as long as the initial address given by the External Pointer (=35492) at the program entry point is correct. However, assume that the External Pointer is incorrectly pointing to the address 35493. The effect of this will be as follows:

(a) The instruction at address A, which was originally designed for the purpose of performing the operation C1 : =C1+1, will now actually add 1 to the contents of the memory word at address 35493. Hence it will not be performing the operation C1 : =C1 +1 at all, but instead be performing the equivalent of the operation P1:=P1+1, thereby making P1 contain the value 48374 instead of 48373.

(b) The instruction at address A+1 originally designed for the purpose of reading the pointer P1 134 prior to incrementing the counters C2 138 and C3 140 will now read the contents of the memory word at address 35494, i.e. it will perform the equivalent of reading and using the contents of the data element X 136 as a pointer.

(c) The instructions at addresses A+2 and A+3 originally designed for the purpose of performing the operations C2: =C2+1 and C3:=C3+1 will now perform the operations on the memory at the addresses indicated by the current contents of the data element X 136. Because the contents of X 136 varies with time, this means that two consecutive memory words at random will be incremented. In other words, random errors will be introduced into the system.

(d) The instruction sequence at addresses A+4 to A+7 designed for the purpose of performing the operation Y 146:=X 136 will now perform a transfer of information from a memory word outside the user area in FIG. 8 (i.e. at address 35495) to a randomly indicated memory word.

The above type of software error introduced by executing otherwise correct programs with faulty pointers is defined as cross purpose memory accessing, because a memory word used for a specific purpose may now inadvertently be used for a completely different purpose. One of the worst characteristics of a system where cross purpose memory accessing is possible is that a single error 'breeds' new errors. The execution of the instruction sequence from A to A+7 above with the incorrect pointer value will for instance generate a total of 8 errors, five of which are inside the user area of FIG. 15, i.e. C1 132, C2 138 and C3 140 are left unincremented, the old value of Y 146 is not overwritten by the value of X 136 and the pointer P10 134 is erroneously incremented where it should not have been incremented. If now the same sequence of instructions is executed a second time, this time with the correct input pointer value, then the instructions at the addresses from A+1 to A+7 will generate new errors by virtue of the fact that P1 134 now contains a faulty value left by the previous faulty execution. In this case C2 138 will not be incremented where it should. The instruction sequence which should have incremented C2 138 will now increment C3 140, thus by random chance generating the correct result and thereby actually masking the error. The instruction sequence which should have incremented C3 140 will now increment P2 142, thus again generating a potential new 'error breeder'. Finally, the instruction sequence by means of which the operation Y 146:=X 136 is realized will again generate an error outside the user area of FIG. 8.

It should be evident that any system where cross purpose memory accessing is potentially possible will work as long as no cross purpose memory accessing error exists within the system. However, it should be equally evident that if even a single cross purpose memory accessing error is introduced anywhere in the system, then correct operation of the system, both in parts and as a whole, can no longer be guaranteed. One of the consequences of this state of affairs is that if even one cross purpose memory accessing error is detected, then the probability approaches one that additional cross purpose memory accessing errors exist within the system. Hence the only practical means of restoring the system to a state where faultfree operation will be possible is to restart the entire system, i.e. to unconditionally interrupt the ongoing program execution, to reset all data areas to predefined values and thereafter to start program execution from a predefined restart point for the system as a whole.

One of the known methods for detecting cross purpose memory accessing errors once they have occurred is by means of so called 'Audit Programs'. Audit programs are periodically or on demand executed programs, which postulate the existence of implicit or explicitly introduced redundancies in the software. The pointer P2 142 in FIG. 8 is one example of such an explicitly introduced redundancy. It is now possible to design an audit program which, given the External Pointer (=35492) as input data, will address the memory word containing P1 134 by adding 1 to the External Pointer, use the stored value of (the assumed) P1 134 as a new pointer, add 2 to this value, thereby (assumedly) addressing P2 142, reading (the assumed) P2 142 and comparing this value with the original External Pointer. If no cross purpose accessing error exists within the areas checked and controlled by this audit program, then the values will match as they do in FIG. 8. If a mismatch is indicated by an audit program, then the existence of at least one cross purpose memory accessing error is indicated. The system therefore will have to be restarted in order to clear the indicated error as well as any other existing but not detected cross purpose memory access error or any consequence thereof.

Cross purpose memory accessing errors may be caused by both software and hardware faults. It is therefore impossible to guard against cross purpose memory accessing errors purely by software means. One of the principles which has been used to reduce the cross purpose memory accessing error problem, is to establish separate memory areas which are then used for different purposes, the memory area being physically separated from each other by assigning each such area a characteristic set of properties, which are recognized by the hardware and therefore may be used for protection purposes.

FIG. 9 illustrates an example of such a separation of memory areas with the following four types of memory areas:
* Permanent Data Area 150—A memory area containing data elements, which may be read by any program, but must not be written into by any program during normal operation. A permanent data area may be assigned the Read Only (RO) property by hardware means.
* Semipermanent Data Area 152—A memory area containing data elements, which may be read by any program, but may only be written into by certain programs, provided that explicitly defined security and verification measures are undertaken. A semipermanent data area may be assigned a Conditional Read Only (CRO) property by hardware means.
* Transient Data Area 154—A memory area containing data elements, which may be freely read and written by any program. A transient memory area has the basic Read/Write (RW) property.
* Program Area 156—A memory area containing executable programs or programs with embedded permanent data elements. A program area may therefore be assigned the Execute Only (EO) or the Execute and Read (ER) property.

By introducing separate instructions (or parameters of the instructions) for reading and writing information from and into areas with different properties, it will now be possible to detect some of the cross purpose accessing errors when they actually occur instead of the after the fact, which is the only means possible for audit programs. For instance, it is possible to design a hardware protection mechanism to be triggered :
(a) when writing into transient data 154 is intended, but the actual memory address points to a semipermanent data area 152, a permanent data area 150 or a program area 156.
(b) when authorized writing into a semipermanent data area 152 is intended, but the actual address points to a permanent data area 150 or a program area 156.
(c) when reading of data is intended, but the actual memory address indicates a program area with the Execute Only property.
(d) when execution of a program is intended, but the actual memory address indicates an area which does not have an Execute property.

A number of different possibilities exist, whereby such a hardware protection mechanism may be realized. One possibility is the physical separation of areas into separately addressable memories. In this case the protection mechanism may simply utilize some of the address bits in combination with the required property as defined by the actual instruction (or a parameter thereof). Another possibility is the logical separation of the areas within the same memory by means of adjustable hardware registers, wherein the limits of each area may be defined. In this case the protection mechanism will decode the required property from the actual instruction (or a parameter) in order to define the set of limit registers to use, whereafter the actual address may be compared with the limit registers to ascertain that the address lies within the allowed limits. Still a third known method is the adding of control bits for each memory word in addition to the information bits, whereby the control bits indicate the actual property of the information to be stored within the memory word.

None of these methods give adequate protection, however, because all cross purpose memory accessing errors cannot be detected. If, for instance, writing of information to a transient data element is intended, but the address of another transient data element is actually indicated due to a cross purpose memory accessing error, then no triggering of the protection mechanism will occur. Similarly, authorized writing into semipermanent data with the actual address pointing within the semipermanent data area or within the transient data area will also go undetected, etc. As a consequence, the actual error which eventually triggers the hardware protection mechanism may be the first cross purpose memory accessing error, in which case the error localization and correction is simple. More often than not, however, the actual error which triggers the protection mechanism is only one of the secondary errors caused by some previous, undetected cross purpose memory accessing error. In this case the error localization is extremely difficult because the actual error may have been caused by a faultfree program operating with faulty data as has been described above. Also, in this case, the only practical error elimination scheme is a complete system restart to clear the system from all as yet undetected but latent cross purpose memory accessing errors.

Of the three possible protection mechanisms mentioned above, the third has the disadvantage that it requires extra control bits for each memory word, and thereby requires more resources than the other methods, where the protection mechanism may be more centralized. It is mainly for this reason that the other methods have been preferred, i.e. separation of memory into disjoint areas with different properties. This has, in fact, been a contributing factor to the 'distributed' software realization illustrated in FIG. 6, where a single user is allocated multiple disjoint areas in the memory.

Dispersing the software belonging to, or associated with, a single user over disjoint areas in memory as illustrated in FIGS. 6 and 7 (which is forced for reliability reasons if a logical or physical separation of memory areas as described above is used) reduces the manageability and maintainability of the software, because each piece of software must now be handled separately. For manageability as well as for maintainability reasons it would be advantageous if each user software unit could be handled as a single unit also when stored in memory. The method with extra control bits for each memory word attempts a partial solution to this problem. Nevertheless it will still not give an adequate cross purpose memory access protection. FIG. 10 illustrates a simplified example of the utilization of this method for the implementation of the software associated with a single user.

The user software is shown to be implemented as a User Program Area 160 and a User Data Area 170. The User Program Area contains a number of instructions, which together form the actual user program. The starting point of the User Program Area is given by the ESS pointer (Executable Segment Start) 161. The User Data Area contains a number of data elements. These data elements have been named DE1 to DE10 in the order they have been implemented within the actual memory words. The starting point of the User Data Area is given by the DSS pointer 162 (Data Segment Start). The actual data elements DE1-DE10 in FIG. 10 may be regarded as an example of the implementation of the following logical data elements:

DE1: HEADER is read-only string(8)="USER32XX",
DE2: COUNTER1 is integer 0 to 300,
DE3: COUNTER2 is integer −1000 to 1000,
DE4: STATUS is array (0 to 4) of conditional-read-only WORD,
DE5: OUTLINK is link,
DE6: TIMER is array (0 to 4) of integer 0 to 15,
DE7: CATEGORY is array (0 to 4) of read-only set (ON, OFF)=(ON', ON, OFF, OFF, ON')
DE8: COUNTER3 is conditional-read-only integer 0 to 9,
DE9: NUMBERING is integer 0 to 10000,
DE10: CHECKSUM is read-only integer 0 to 10000, where HEADER, COUNTER1, etc. are the actual functional names of these data elements as used in the program. Each memory word in FIG. 10 contains a set of information bits and a set of control bits. The control bits are assumed to indicate the property (EO, ER, RW, RO, CRO) associated with the information stored in the information bits of the memory word. Hence all the memory words used to store instructions of the program are defined to be EO words (or ER where appropriate). The data words DE1-DE10 are defined as RO, CRO or RW words, depending on how the associated information is defined. The control bits may of course be used for purposes other than property indication, e.g. redundancy checks (not relevant for the present purpose).

As illustrated by FIG. 10 it is possible to locate data elements with the same properties within the same memory word, provided that a sufficient number of information bits are available to accommodate all information elements within one word. It is not possible to mix data elements with different properties within the same memory word, even when there are unused information bits available. Hence a certain amount of unused information bits is always implied.

Accessing of the memory in FIG. 10 is done by the well known Base Address +Offset technique. Thus the base address of the User Program Area is given by the ESS 161 pointer and the actual instruction undergoing execution by a relative Program OFFset (POFF) 163. Similarly, the base address of the User Data Area is given by the DSS pointer 162 and the actual accessed data element by a relative Data OFFset (DOFF) 164 given as an operand within the data accessing instructions. This technique is even directly supported by current microprocessors like the MC68000, the Z-8000 and the 8086, where base or segment registers are utilized for the base addresses with the offsets specified separately and independently of the base addresses.

Although a certain amount of hardware support is already available, this does still not solve the cross purpose memory accessing problem because :
(a) The base addresses in the base/segment registers are still calculated by the programmers and are therefore subject to programming errors.
(b) The offsets themselves may be directly given in the instructions, but may also be indirectly calculated by the programmer. In the latter case the offsets are also subject to programming errors; and (c) Utilization of adequate software range checks is generally avoided because of their accompanying unacceptable performance degradation.

The calculation of the base addresses is a relatively straightforward matter, because these refer to specific and unambiguously defined points in the memory of a system. FIG. 11 illustrates the well known technique of a general System Descriptor Table (SDT), where each user is assigned an entry in this table. Such a Descriptor Table is for instance forming the central Address Calculation Unit described in the Swedish patent 365 093. Each entry is assumed to contain four items of information for the purpose of base address calculation. These four items are:

| ESS | The Executable Segment Start Address |
|---|---|
| ESSZ | The Executable Segment Size |
| DSS | The Data Segment Start Address |
| DSSZ | The Data Segment Size |

Use of a System Descriptor Table of the kind illustrated in FIG. 11 gives a number of advantages. Calculation of the base address for a program or a data area for a particular user is a matter of a simple readout of the appropriate information from the table entry associated with that user. Secondly, the offset value for any instruction or data element may simply be checked against the specified segment size in order to indicate overflow. Thirdly, it is possible to perform the base address calculation and range check of any offset automatically by integrating it in the hardware or the firmware of the system, thereby making it impossible for the programmers to fiddle with these address calculations. Fourthly, it is possible to make all user areas completely relocatable, even under on-line conditions, provided that no user programmable pointer relationships are used anywhere within the system. Fifthly, it is possible to assign the actual table entry associated with a particular user software unit dynamically when that software unit is loaded into the system, thereby providing a basis for pluggability of the software units. Finally, it is also possible to separate the Program Areas, the Data Areas and, in fact, the System Descriptor Table Area itself from each other by means of physically disjoint memories in order to enhance the performance of a system by the resulting ability to access the memories in parallel. The processing system of the Telecommunication System AXE designed by L.M. Ericsson in Sweden is a typical example of a system utilizing the above mentioned method in order to obtain the advantages mentioned.

A number of problems still exist, however, particularly in connection with the calculation of the offsets for the different data elements associated with a particular user. Unique data elements, i.e. data elements which occur only once, do not normally cause any problem, because their offset values may be hardcoded as operands into the instructions relative to the actual base address, provided that the hardware operates on the base address +offset principle. This is assumed to be the case with the data elements HEADER, COUNTER1 and COUNTER2 (corresponding with DE1, DE2 and DE3 in FIG. 10), where HEADER (DE1) is implemented as the first word relative to the base address DSS 162 (i.e. word offset=0), COUNTER1 is implemented as the least significant part of the second word relative to the base address DSS (i.e. word offset =1 with bit offset within the word=0 and a specified number of bits to be accessed) and COUNTER2 is implemented as the most significant part of the second word relative to the base address DSS (i.e. word offset=1 with a specified bit offset within the word>0 and a specified number of bits to be accessed). Because these offsets are fixed offsets and do not change with time they may easily be hardcoded into the instructions, either as direct accesses (in the case of word accesses or when the hardware supports different access formats) or as masked accesses (for part-of-word accesses in systems where only word accesses are directly supported).

Accessing of the data element STATUS, which corresponds with the DE4 array in FIG. 10 is more complex. First of all it is normally not the entire array that is accessed but only a single element of the array. Thus it will be a single element DE4(X) which will be accessed, where X is defined as the index of the actual element. According to the definition the index may vary within the range 0–4. The actual address of any accessed element is in this case composed of the following three elements:

(a) The Base Address of the Data Area itself (DSS) 162.

(b) The Offset to the first element of the array (i.e. the offset to the memory word containing DE4(0)=2).

(c) The Index Displacement of the actual element of the array, calculated as the actual Index times the Length of a single array element, where this length is to be taken as the number of bits reserved for a single array element.

In FIG. 10 the DE4 array occupies five words in the memory with each array element utilizing an entire memory word. The actual data offset for STATUS (2) occupying DE4 (2) is now calculated as:

DOFF=2 [Offset to DE4(0)]+2 [Actual index]* 1 [length of array element]

The Length of each array element is a fixed value and can therefore be hardcoded into the instructions of the accessing program. However, because the index value is variable, the address calculation must be explicitly performed by the programmers themselves and will therefore also be subject to programming errors. In order to guard against such errors an index range check is *always* warranted to ensure that the used index at all times remains within its legal range (0 to 4 for DE4 in FIG. 10). Often this index range check is omitted because it will significantly degrade the performance of the system, thereby again making cross purpose memory protection errors possible.

When the length of an array element is less than a memory word as illustrated by the data elements CATEGORY and COUNTER3, which are implemented as DE6 and DE7 in FIG. 10, then certain new problems arise in the actual memory accessing. The simplest solution is, of course, to reserve an entire memory word for each array element regardless of whether the memory element actually utilizes the memory word or not. Because of hardware limitations no single part-of-word element should actually cross a physical word boundary in the memory. Thus, whenever a particular array element requires more than half of the available bits of a memory word, then an entire memory word must be reserved for each array element. However, when a particular array element requires less than half of the available bits in a memory word while, at the same time, the number of elements in the array becomes large and the number of bits required per array element is small, then reserving an entire word for each array element leads to a considerable waste of memory space, which in some cases will be completely unacceptable. The solution for such cases is to pack more than one array element in the same word. The number of bits actually reserved for each array element must be an integer fraction of the number of bits in an entire memory word in order to ensure that no array element will cross a physical word boundary. As an example, in a system with 24 bit memory words, array elements of 1, 2, 3, 4, 6, 8, and 12 bits would be possible. Hence, if a logical data element would require 7 bits, then an 8 bit array element would actually be used.

As long as the number of elements in an array is fixed, the accessing of any element in the array does not pose any great problems, provided that adequate range checking is performed at all times. However, the number of elements in arrays do vary. Normally the number of elements is increasing with time as the systems expand in order to be able to cope with new requirements. Any associated arrays must also be extended. The effect of this expansion can be devastating. The data element DE5 in FIG. 10 occupies words 8-10 in the User Data Area, i.e. the word offset to this data element, which is hardcoded as an operand into the instructions of the program, is 7. If now the DE4 array is extended by 3 more array elements, then the entire DE4 array would thereafter consist of 8 elements, i.e. DE4(0), DE4(1), DE4(2), DE4(3), DE4(4), DE4(5), DE4(6) and DE4(7). For pure address calculation reasons the new array elements have to be appended to the previous array elements, i.e. they have to occupy memory words 8, 9 and 10. However, these memory words were previously occupied by DE5. In other words, extension of an array may cause other data element to be relocated. In our example DE5 would now be relocated 3 words forward, thereby necessitating a change of the hardcoded memory offsets within the program. This change will of course ripple through all subsequent data elements. This is especially dangerous if a number of disjoint programs access the same data areas, because it will be difficult to verify that all data accesses have actually been changed. Thus the extension procedures may again form a potential cause of cross purpose memory protection errors. This problem is further complicated when multidimensional arrays are used, i.e. arrays where the element of the arrays in themselves are arrays.

One partial solution to the above problem is the way utilized within the previously mentioned AXE system, which is described in Ericsson Review No. 2, 1976, and also described in the Swedish patent 365 093.

This system recognizes that any user function may be implemented in software in the standardized way shown in FIG. 12, where a user function comprises a Program part 180, a Common Data part 182 and an Individual Data part 184.

The Program part of FIG. 12 corresponds with the User Program Area 160 in FIG. 10.

The Common Data part may be considered to contain all unique (nonreplicated) data elements in FIG. 10, i.e. DE1, DE2, DE3, DE5, DE8, DE9 and DE10.

The Individual Data part consists of an array with n elements in FIG. 12. Hence the data elements DE4, DE6 and DE7 in FIG. 10 may be considered to belong to the Individual Data part with n=5.

FIG. 13 shows the actual implementation principles of the system. For performance reasons the memory of the system is separated into three physical memories, the Program store (PS) 190 containing all programs, the Data store (DS) 192 containing all user data and the Reference store (RS) 194 containing all System Descriptor Tables.

The Reference Table in FIG. 13 corresponds directly with the System Descriptor Table in FIG. 11. Each user function is defined as a Block. The Central Processing Unit directly supports the structure with a dedicated Block Number Register 196 holding the identity of the currently active block. The contents of the Block Number Register are used to identify the actual Reference Table Entry. The three most important elements of a Reference Table Entry are shown in FIG. 13. These are:

| | |
|---|---|
| PSA 198 | The Program Start Address. This corresponds directly with ESS in FIGS. 10 and 11. |
| BSA 200 | The Base Start Address. This corresponds indirectly with DSS of FIGS. 10 and 11 in the manner explained below. |
| BS 202 | Block State. Administrative information. |

Each Reference Table Entry also contains auxiliary information elements like the ESSZ and DSSZ elements in FIG. 11. These elements are not shown in FIG. 13.

The Program shown in FIG. 13 corresponds directly with the User Program Area of FIGS. 10 and 11 (disregarding the Signal Distribution Table at the beginning of the Program).

The implementation of the Data Area differs from the principle shown in FIG. 10 and FIG. 11. Instead of assembling all data elements belonging to a single user into a single User Data area in the manner shown by FIGS. 10 and 11 each individual data element is separately and individually assigned a memory location in the Data Store (DS) 192. In order to allow an easy address calculation to each single element a Data Descriptor (called a Base Address in FIG. 13 is associated with each single data element, regardless of whether the data element is a single element or an array element. All Base Addresses for data elements belonging to a particular block are assembled into the Function Block Base Address Table 204 for that particular block. The start address to this table is given by the BSA 200 address in the reference table entry corresponding with the block. Each base address contains all the relevant information associated with the corresponding data element, i.e.:

* The absolute address where the data element is located (or the start address of the first element of an array).
* The length of the data element in number of bits.
* Indication whether the data element is an array element or not.
* The number of array elements if the data element is an array.
* Auxiliary information not directly relevant for the described purpose and therefore not further itemized.

The described base address table principle has a number of advantages. Specifying all the information relevant for the calculation of an address as part of the base address makes programming simple, because the programmer will not have to perform an explicit address calculation at all. The only information required to access a particular data element is the offset to the base address associated with that data element. It is to be noted that the accessing of array elements by means of a simple offset is only possible when it is indicated within the base address itself that an element is an array element and when, furthermore, the index to the actual array element to be accessed is given by a predefined special purpose process register within the CPU. In FIG. 13 this special purpose process register is denoted as the Pointer Register 206 and is used to identify one instance of the Individual Data shown in FIG. 12. By designing the CPU so that the actual offset is always given directly as an operand within the machine instructions (corresponding with the OP1 84 or OP2 86 parts of a machine instruction in FIG. 3) it is possible to simplify the programming considerably. Any unique data element within either the Common Data or within one instance of the Individual Data may now be directly accessed by means of its fixed, hardcoded offset value. Provided that the index to the actual instance of the Individual Data and the base address itself are checked, then cross purpose memory accessing errors can be completely eliminated as far as these unique data elements are concerned.

Unfortunately both single- and multidimensional arrays may still exist within both Common Individual Data. For these array elements the addressing still has to be explicitly specified with associated explicit address checks. This case is still subject to the previously mentioned drawbacks with the associated possibility for cross purpose memory accessing errors still in existence.

One of the big advantages of a system designed according to the principles illustrated in FIG. 12 as compared to a conventional system designed according to the principles of FIG. 5 that the data elements belonging to a particular user only accessed from the program part belonging to that same user. This is the reason why each particular user may have its own unique base address table (=the Function Block Base Address Table 204 in FIG. 13), which is only accessible by the program part associated with that particular user. This considerably simplifies the maintainability, manageability and enhancability of the software, because every user function may now be handled as a single entity. It is still not possible to handle any part of the user functions (i.e. program part, common data part and individual data part) separately because these are logically tied into each other.

Secondly, the reliability is also directed enhanced, because it is now possible to introduce a hardware protection against a particular user accessing the base address table belonging to a different user, thereby preventing all accesses of data elements belonging to a particular user by other users before that access can take place. If no multidimensional array elements exist it is even possible to extend this hardware supported protection to the level of a single data element in FIG. 13 (i.e. C1, C2, X, Y). There is now no need for separate access right protection associated with a particular memory word (by means of extra control bits in addition to the information bits) or associated with a particular memory area (by means of limit specifying register or similar) as previously described. This is the reason why the access right indication may be part of the base address itself.

An arrangement according to FIG. 13 requires the supporting processors to be specially designed in order to achieve efficient implementation. This arrangement cannot therefore be efficiently supported by presently available microprocessors, because these operate on, and efficiently support, the general base address +explicitly indicated offset principle illustrated in FIG. 10. On the other hand, a specially designed processor cannot efficiently support an implementation according to FIG. 10. In neither case are multidimensional arrays efficiently and reliably supported, because they must always be explicitly programmed.

With an arrangement according to the invention the above described disadvantages can be completely eliminated while at the same time being able to use one of the commercially available microprocessors.

SUMMARY OF THE INVENTION

It is an object of this invention to eliminate the disadvantages of the prior art and to provide an apparatus for the conversion of virtual to real addresses which can convert the addresses without requiring instruction from the central processing unit.

Additional objects and features of the invention will appear from the following description in which preferred embodiments of the invention have been set forth in conjunction with the drawings.

BRIEF DESCRIPTION OF THE DRAWINGS

FIGS. 2A and 2b show how individual binary elements are compiled into a single value;

FIG. 3 illustrates instruction decoding;

FIG. 12 depicts an implementation of a user function;

FIG. 20 shows an example of a Data Description Table;

FIG. 21 illustrates an alternative memory space allocation for data elements; and FIG. 22 shows an alternative Data Description Table.

DESCRIPTION OF THE PREFERRED EMBODIMENT

The basic principle of the invention will be described with the aid of FIGS. 14–22.

Figure 7:
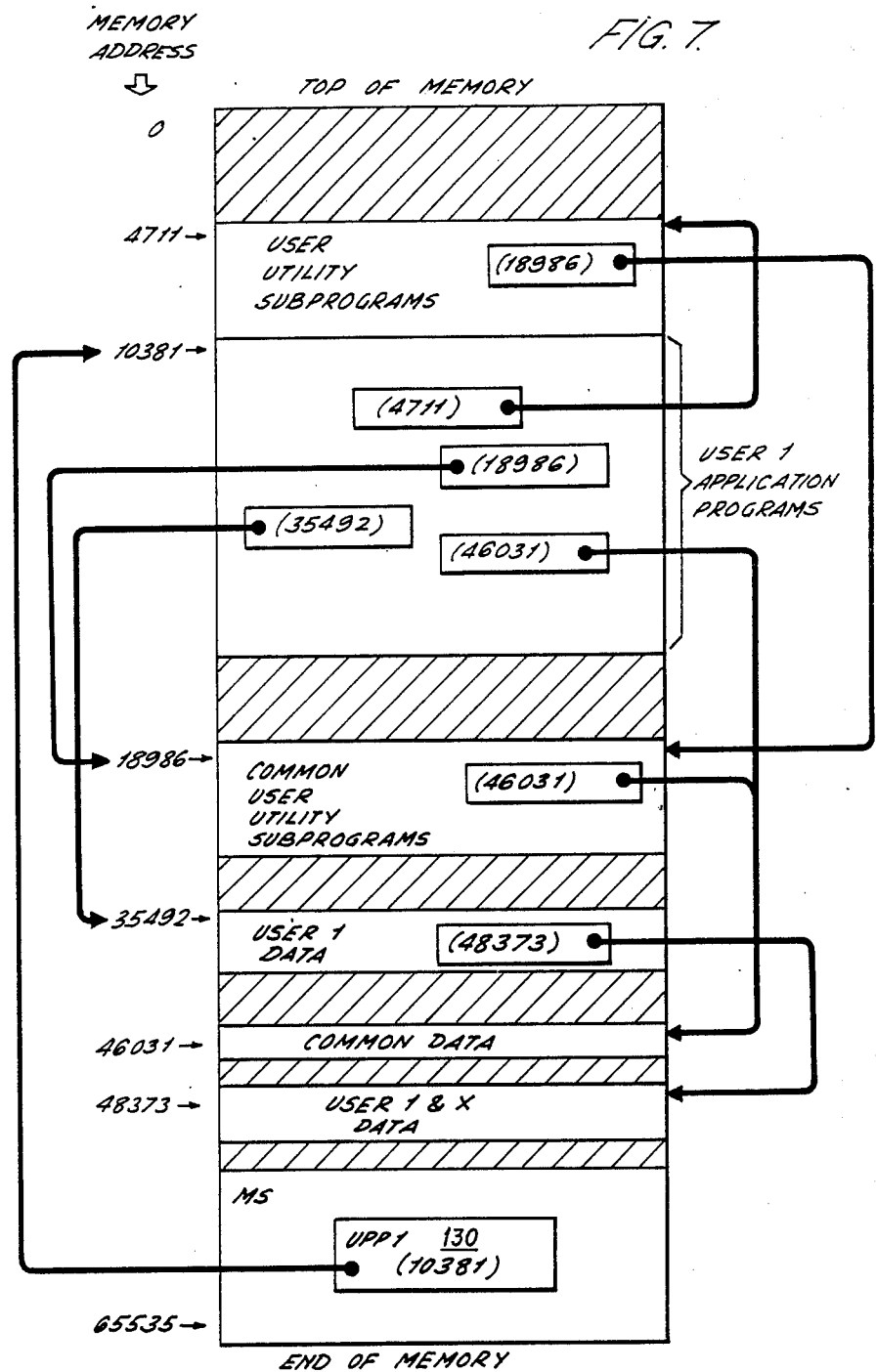
FIG. 7 illustrates a possible pointer relationship for a single user.
Figure 8:
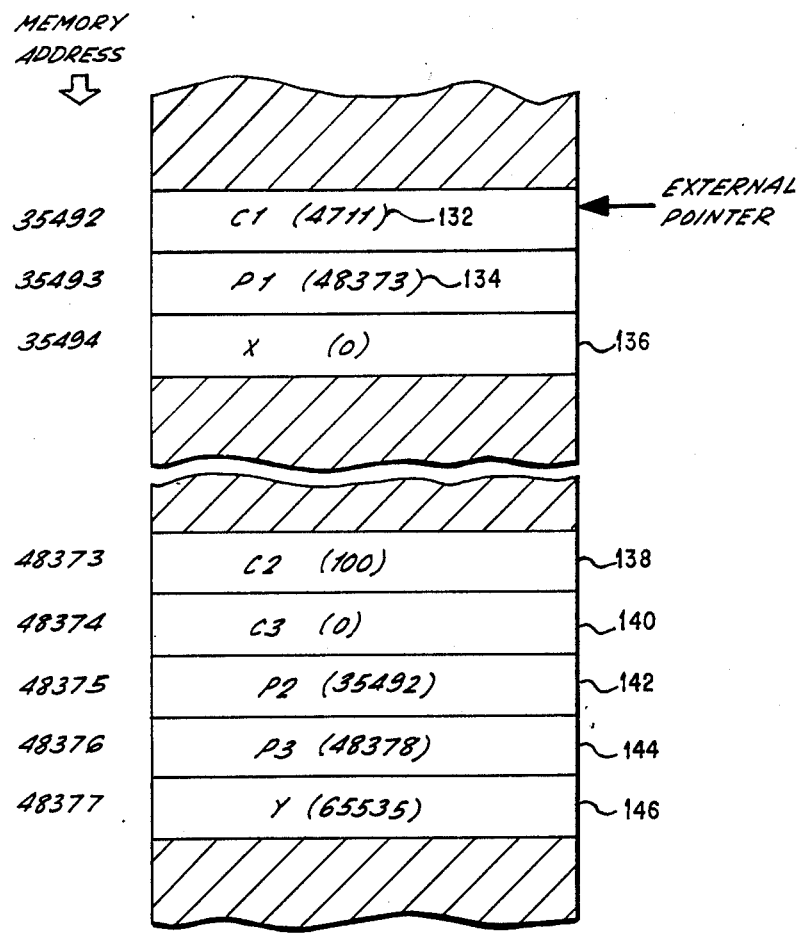
FIG. 8 shows a data structure where pointers are used.
Figure 9:
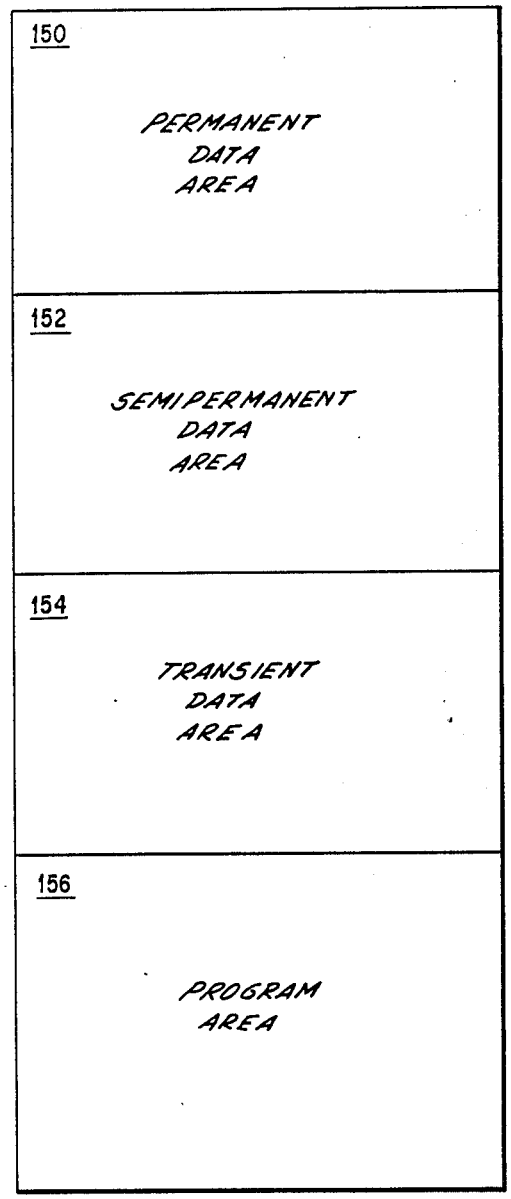
FIG. 9 illustrates a memory protection scheme involving separation of memory areas.
Figure 10:
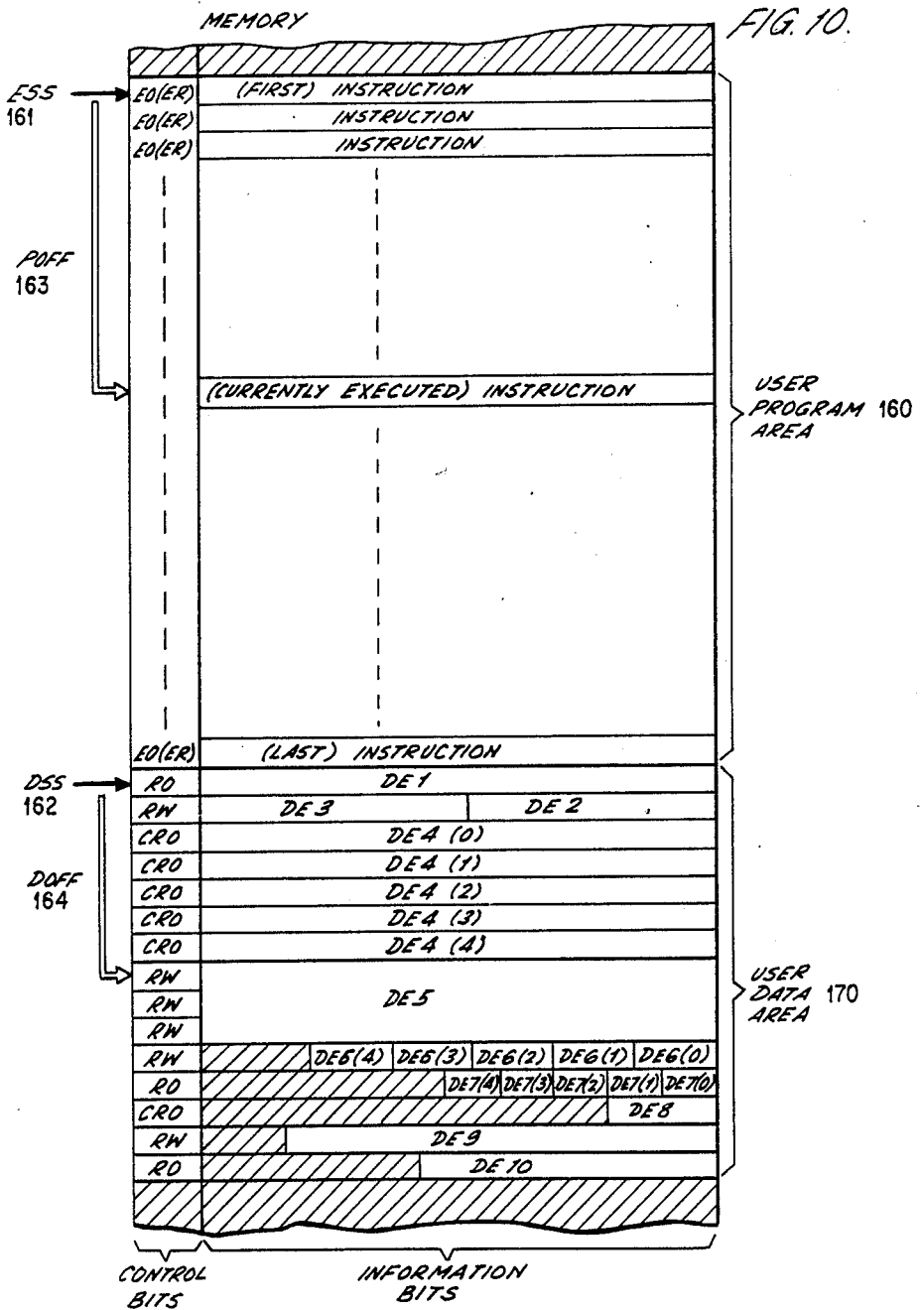
FIG. 10 illustrates using control bits on each memory word.
Figure 11:
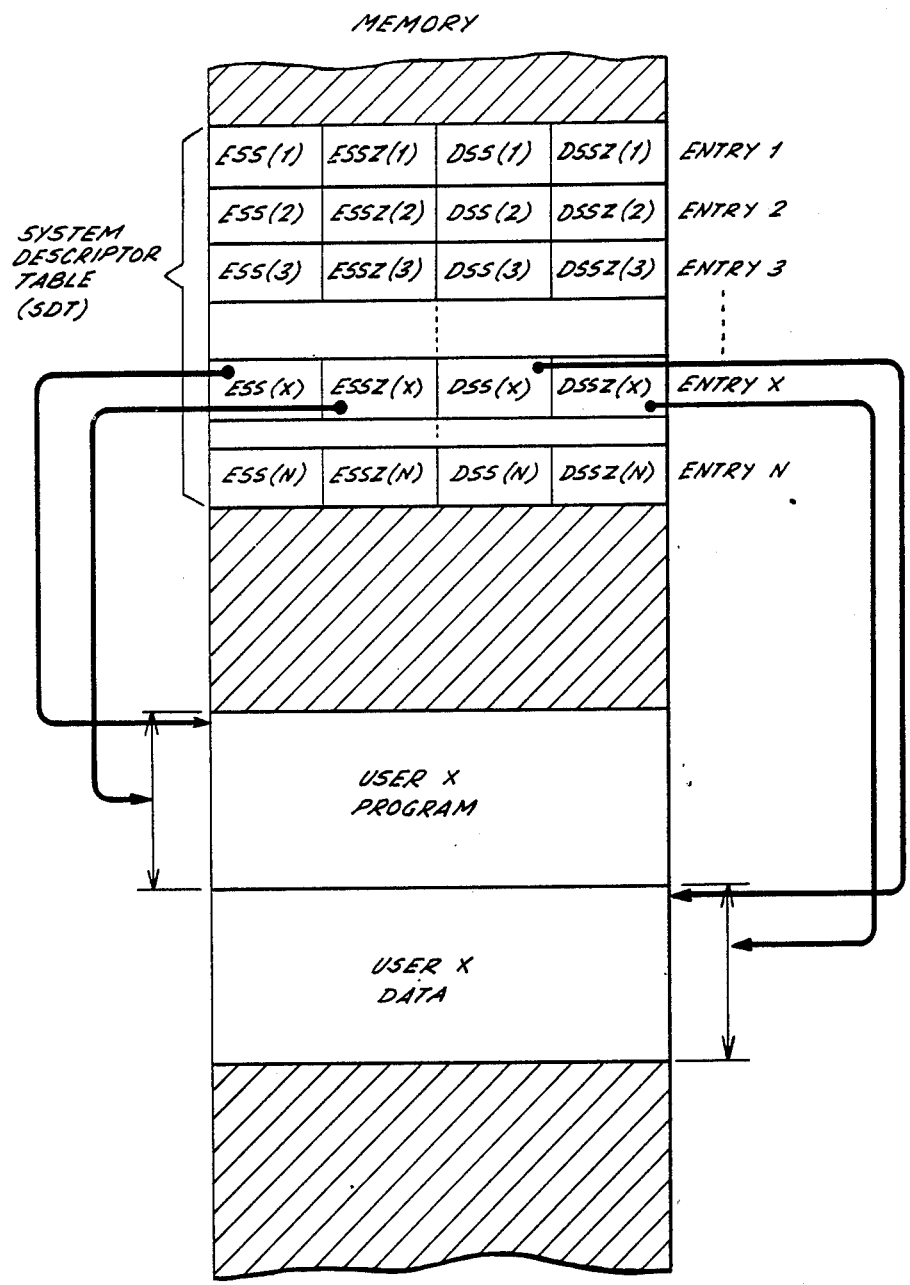
FIG. 11 illustrates a System Description Table.
Figure 13:
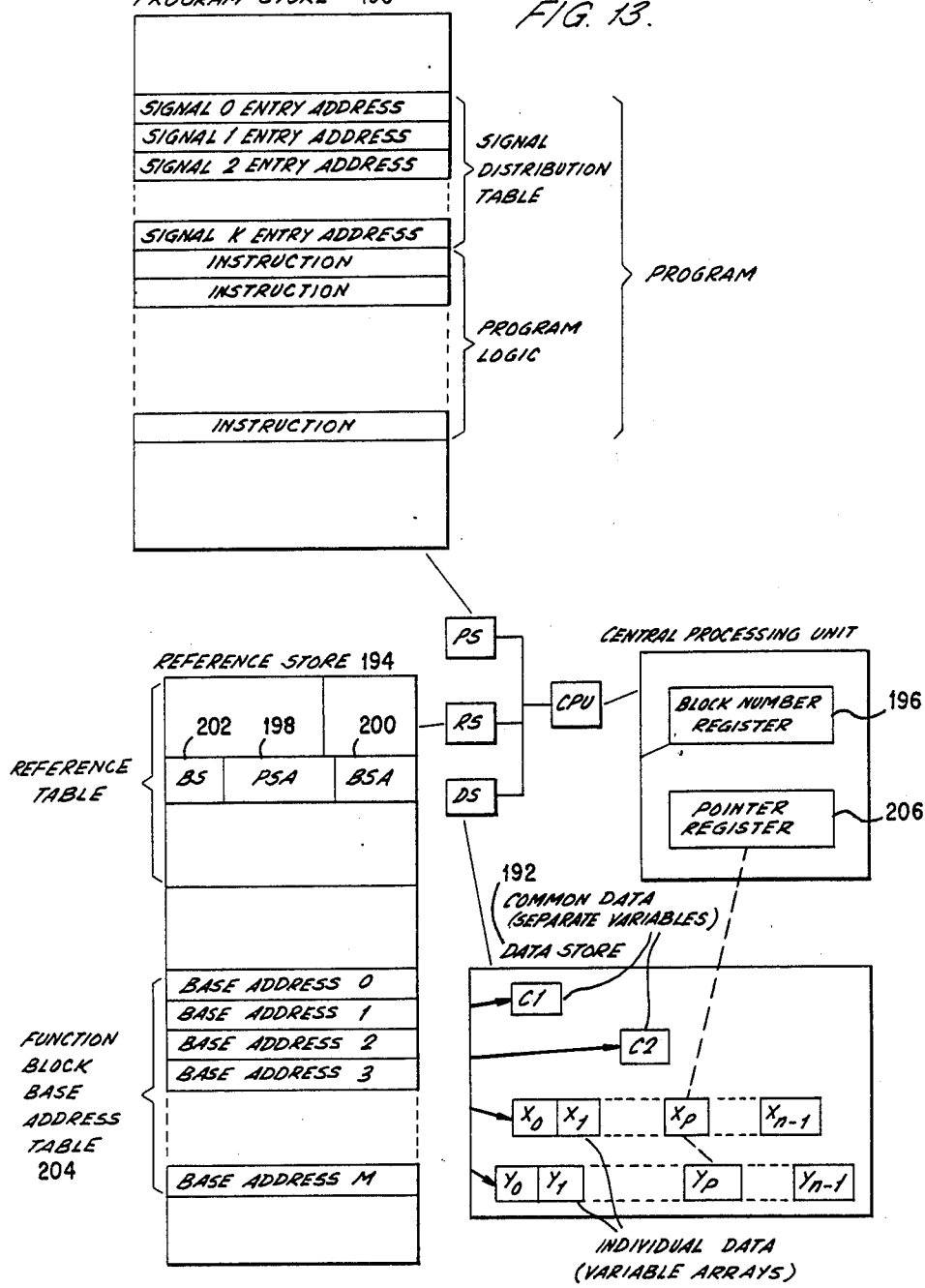
FIG. 13 shows an actual implementation of memory mapping.
Figure 14:
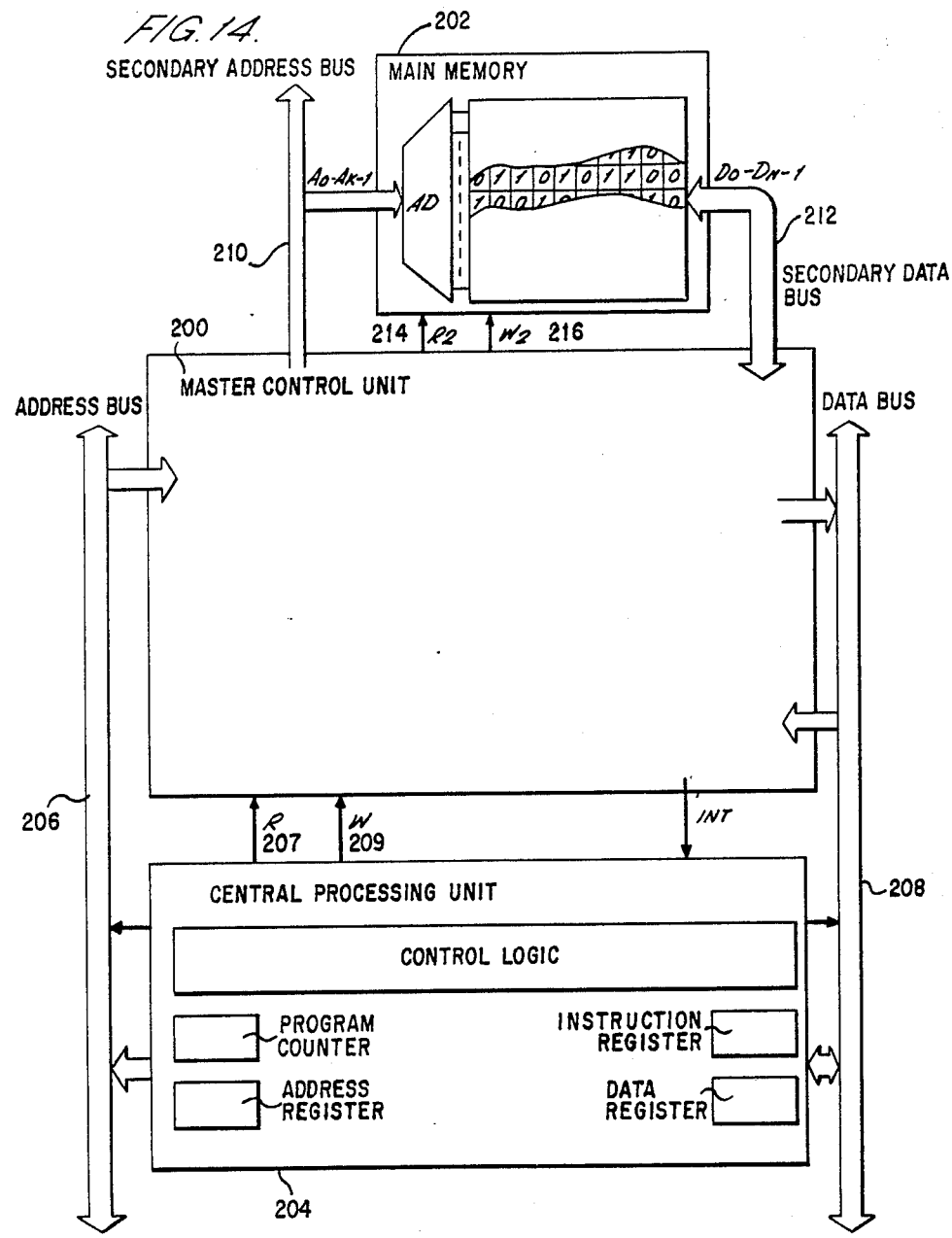
FIG. 14 shows a block diagram of the invention.

FIG. 14 shows the general principle of the invention. A Master Control Unit (MCU) 200 according to the invention is interposed between the Main Memory (M) 202 and the CPU 204, which in themselves may be of the type described in FIG. 7, whereby the Address and Data Buses (ABUS 206 and DBUS 208) from the CPU are connected to the MCU 200, which via secondary Address and Data Buses (ABUS2 210 and DBUS2 212) is connected to the Main Memory (M) 202. The control signals for reading and writing from the CPU are connected to the MCU 200. The MCU 200 issues its own secondary read and write signals (R2 214 and W2 216) when actually reading and writing in the Main Memory. The MCU may also initiate feedback to the CPU 204 via an interrupt line of known design.

Figure 15:
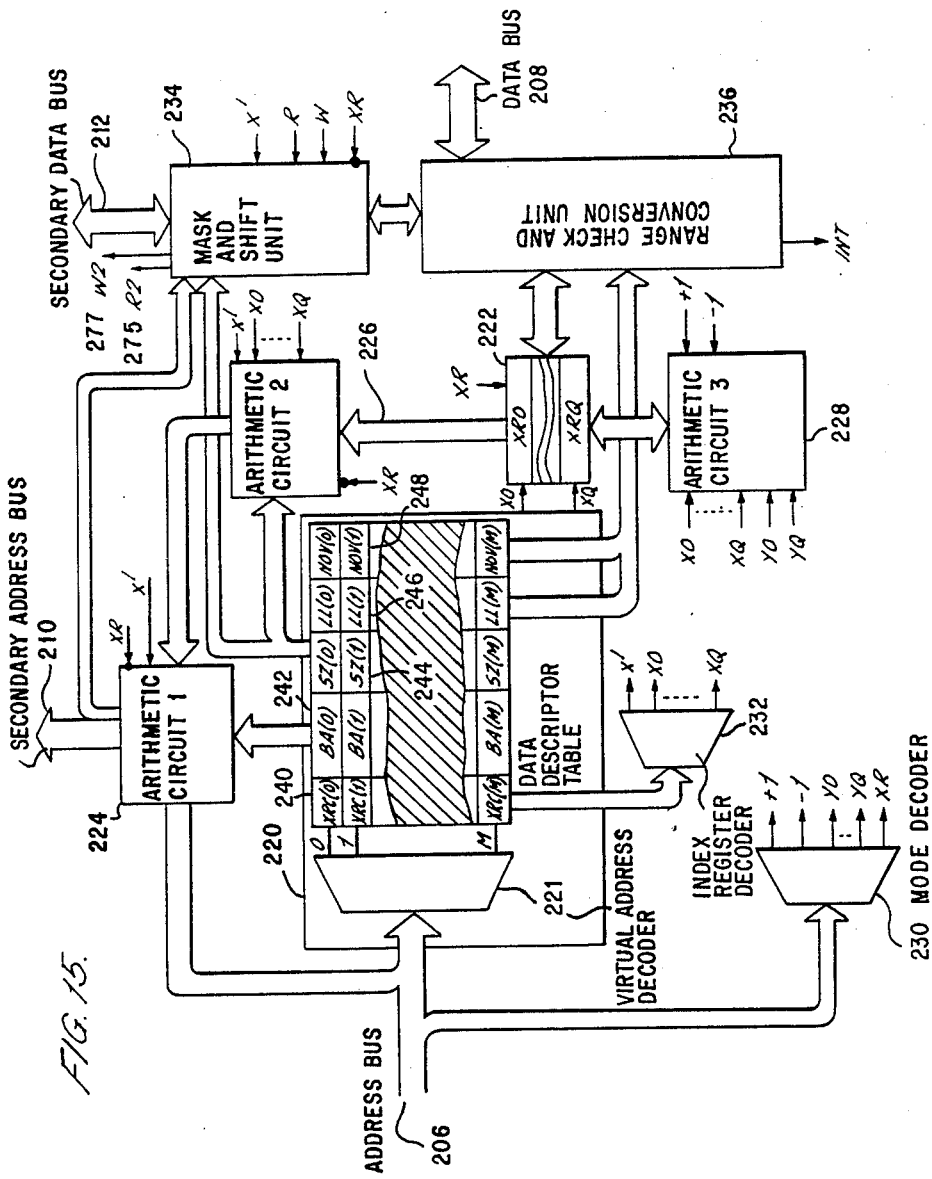
FIG. 15 shows further details of the MCU.

FIG. 15 shows a possible arrangement of the MCU 200 according to the invention. The MCU 200 contains an internal memory for a Data Descriptor Table (DT) 220, a set of internal index registers (XR0–XRQ) 222, three arithmetic circuits (AC1–AC3) 224, 226, and 228, respectively, a mode decoder (MD) 230, an index register decoder (XDEC) 232, a mask and shift unit (MSU) 234 and a range check and conversion unit (RCU) 236.

The virtual address issued by the CPU 204 on the Address Bus (ABUS) 206 consists of two parts according to the invention. The first part is used to indicate one of the possible entries in the Data Descriptor Table (DT) 220 required for translation of virtual addresses issued by the CPU 204 on the Address Bus (ABUS) 206 into Real Addresses issued by the MCU 200 to the Main Memory M 202 on the secondary Address Bus (ABUS2) 210. The Data Descriptor Table 220 contains at least one entry for every addressable data element or structure in the main memory M 202, whereby the actual entry is indicated by means of an address decoder (ADEC1). Each entry is shown to contain 5 parts in FIG. 15, namely the XRC 240, BA 242, SZ 244, LL 246 and NOV 248 parts.

The XRC 240 part of a Data Descriptor Table entry contains a Code which via the decoder (X0EC) 232 is used to indicate whether one of the index registers are to be used in the address translation in the manner that will be further described below. Depending on the actual XRC 240 code value the BA 242 part of the same table entry will either contain the Base Address of a data element or structure in the main memory or indicate a secondary Data Descriptor Table entry. The SZ 244 part contains the actual allocated SiZe of any element to be manipulated by the logic of the MCU 200.

The LL 246 and NOV 248 parts of a Data Descriptor Table entry are intended to be used for range checking and conversion purposes, which range checking and conversion may optionally be integrated in the MCU 200 by means of the range check and conversion unit RCU 236. The principle of this range checking and conversion is subject of a separate patent application and described in the U.K. patent application No. 8334079.

The second part of the virtual address issued on ABUS 206 by the CPU 204 contains a mode indicator. This mode indicator, which is decoded by means of the mode decoder (MD) 230, makes it possible to modify the logic performed by the MCU at the same time as it is performing an address translation. Examples of possible types of modification are :

* Postincrement of an indicated index register, i.e. after it has been used in an address translation.
* Preincrement of any indicated index register, i.e. before it is used in an address translation.
* Postdecrement of any indicated index register, i.e. after it has been used in an address translation.
* Predecrement of an indicated index register, i.e. before it is used in an address translation.

The general types of such modifications are of course not restricted to the types given in the examples above.

Figure 16:
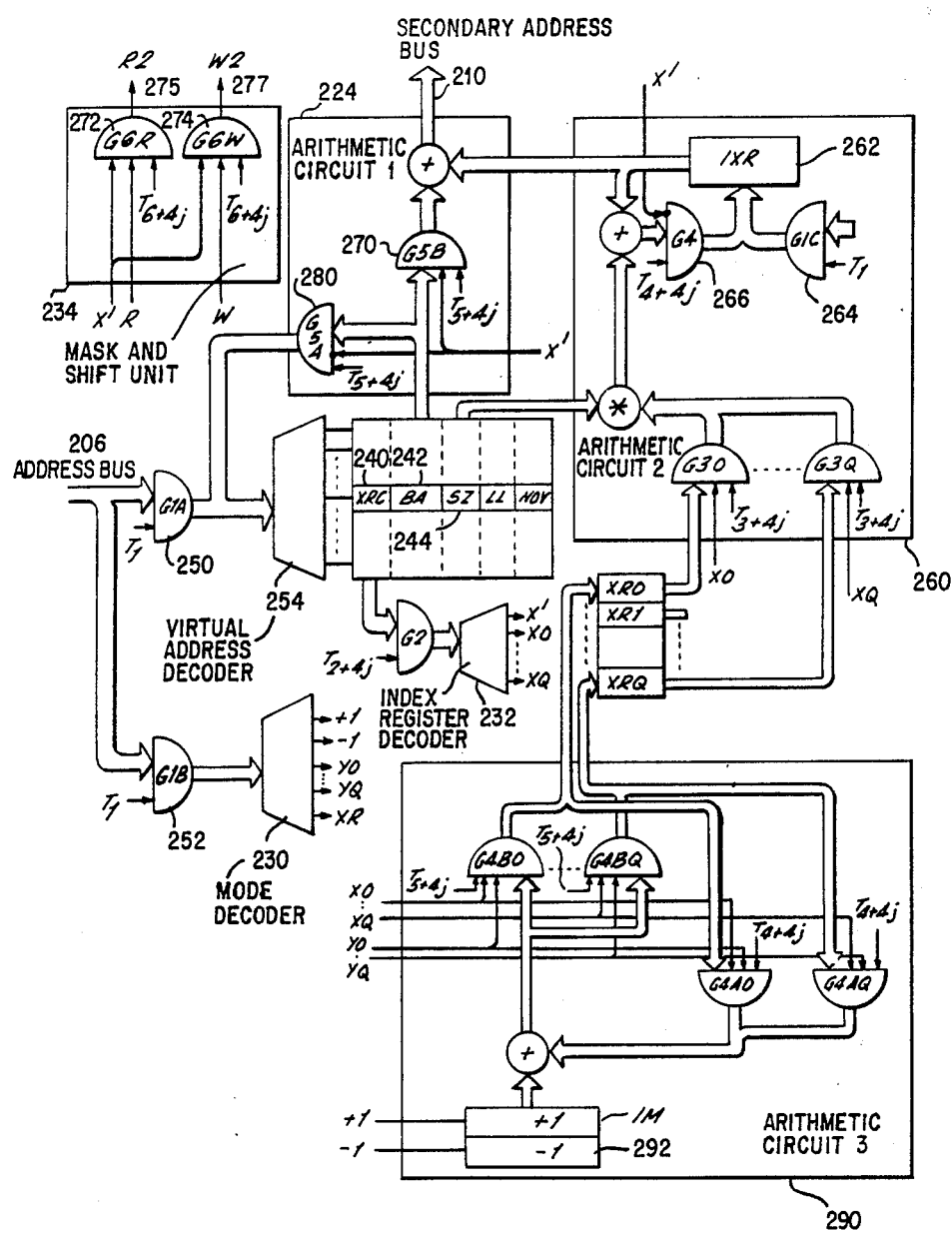
FIG. 16 illustrates Virtual to Real Address translation by the MCU.

FIG. 16 illustrates the main principle of Virtual to Real Address translation by the MCU 200. This address translation principle is valid for both reading and writing of information from and to the main memory (M) 202. The address translation cycle therefore starts when the CPU 204 issues a Virtual Address on its Address Bus (ABUS, 206 and asserts the R (Read) 207 or W (Write) 209 control signal to the MCU 200 (not shown in FIG. 16). The address translation is performed in a number of consecutive phases indicated by means of discrete signals $T_1$, $T_2$, $T_3$, etc. issued by control circuitry of known design, for instance a microprogrammed control unit and enabling the control gates in FIG. 16. Wherever required, internal latching of the information is assumed to exist without this being explicitly indicated to avoid unnecessary complication of the logic shown in FIG. 16. Such latching is standard in logic circuitry and does not add to or detract from the principle of the invention as such.

In phase $T_1$ the two parts of the Virtual Address issued by the CPU 204 on the Address Bus (ABUS) 206 are via two control gates (GIA 250 and GIB 252) asserted and latched at the inputs of the virtual address decoder (VAD) 254 of the Data Descriptor Table (DT) 220 and the mode decoder (MD) 230 respectively. Simultaneously the intermadiate index register IXR 262, which forms a part of the arithmetic circuit AC2 260 is reset to zero via a control gate (GIC 264 in order to prepare for any subsequent address translation.

In phase $T_2$ the XRC code of the table entry enabled by the virtual address decoder VAD 254 is asserted and latched at the input of the index register decoder XDEC 232, whereby one of the outputs X', X0, X1, . . . XQ will be enabled.

Provided that one of the output signals indicating the use of an index register (X0, X1, .. XQ) is asserted by the index register decoder (XDEC) 232 then the contents of this index register will in phase $T_3$ by means of one of the gates G30–G3Q and a circuit multiplier within the arithmetic circuit AC2 260 be multiplied by the SZ 244 part of the table entry still being indicated by the virtual address decoder VAD 254 The result of the multiplication will thereafter be added to the contents of the intermediate index register IXR 262. The result of this addition will then in phase $T_4$ via the gate G4 266 replace the previous contents of the intermediate index register IXR 262.

If no index register is indicated (i.e. the signal X, asserted by the index register decoder XDEC 232), then none of the registers G30–G3Q and G4 will be enabled. In this case phases $T_3$ and $T_4$ could, in fact, be completely bypassed. Such bypassing is again a standard technique and not as such relevant for the invention.

In phase 5 the BA 242 part of the table entry indicated by VAD 254 is transferred to the arithmetic circuit (AC1) 224. If the corresponding XRC 240 code does not indicate use of an index register, then BA 242 contains the Base Address of a data element or structure in the Main Memory (M) 202. In this case the index register decoder (XDEC) 232 still asserts the signal $X_s$.

Hence the control gate (G5B) 270 will be enabled, i.e. the base address is added to the current contents of the intermediate index register (IXR) 262 of the arithmetic circuit (AC2) 260 and the result issued by the MCU 200 on the secondary address bus (ABUS2) 210 to the Main Memory (M) 202. In this case one of the control gates (G6R 272 or G6W 274) of the mask and shift unit (MSU) 234 will be enabled in phase $T_6$. Principally, if the CPU 204 originally issued a Read (R) 207 signal to the MCU 200, then the MSU 234 will issue a secondary read signal (R2) 275 to the Main Memory (M) 202, otherwise a secondary write signal (W2) 277 will be issued. The address translation is thereby complete.

When an index register is indicated, then the BA 242 part of a table entry will not indicate a real base address but instead contain a secondary virtual address. This secondary virtual address will now via the control gate (G5A) 280 be asserted and latched on the input of the virtual address decoder (VAD) 254, thereby replacing the previously latched virtual address. As a result a new table entry will be indicated. Phase $T_6$ will now, instead of terminating the address translation, start a new cycle, where $T_6$ corresponds with $T_2$, $T_7$ with $T_3$, etc. In FIG. 16 this is indicated by $T_{2+4j}$, $T_{3+4j}$, etc. An arbitrary number of index registers may thus participate in any address translation.

FIG. 16 also illustrates a possible arrangement for postincrementing and -decrementing of an index register as part of the address translation by means of the arithmetic circuit (AC3) 290. This arithmetic circuit contains an internal memory (IM) 292, which is shown to contain at least two memory words, 15 the contents of which are fixed to the values $+1$ and $-1$. The appropriate word to be used is indicated by the corresponding output from the mode decoder (MD) 230. In phase $T_{4+4j}$, i.e. after the value of a particular index register has been used by the arithmetic circuit (AC2) 260, the contents of any particular index register is gated onto the adding circuit of AC3 290 via one of the control gates (G4AO—G4AQ), provided that this particular index register is indicated by one of the output signals from XDEC 232 (X0, X1, ... XQ) and that the same index register is indicated by one of the output signals Y from the mode decoder MD 230 (Y0, Y1, ... YQ). In phase $T_{5+4j}$ the result of the addition is gated back to the same index register by means of one of the control gates (G4BO-G4BQ). Depending on which word in the internal memory (IM) 292 is indicated, the index register will be incremented or decremented.

If the arithmetic circuit (AC3) 290 had been designed to operate in phases $T_{1+4j}$ and $T_{2+4j}$ instead of phases $T_{4+4j}$ and $T_{5+4j}$, then the resulting operation would preincrement or predecrement the index register.

FIGS. 15 and 16 show one possible arrangement to implement the basic principles of the invention. A number of variations of the gating and decoding arrangement are of course possible One example is the arithmetic circuit (AC3) 290, where the increment and decrement effects may be achieved without the use of an internal memory etc. Another example is the possibility of bypassing phases $T_3$ and $T_4$ entirely in the case where no index register register is used. A third example is to use a NOR gate with signal X0, X1, etc., as input to generate the signal X' when none of the inputs are asserted. Once the basic principle of the invention is known, such variations become obvious and are therefore not further discussed or described.

All information transfer to and from the Main Memory (M) 202 is performed on a word basis, i.e. information is transferred over the secondary data bus (DBUS2) 212 one word at a time. Whenever the actual logical data element accessed is implemented as a full word, the information may be transferred from DBUS2 212 to DBUS 208 and vice versa without any modification being required (disregarding possible modifications by the range check and conversion unit RCU 236).

Utilizing one word of storage space for every data element is not an efficient way to use the available memory space, however, because many data elements do not require a full word. The logical data type Boolean with its two possible values true and false may, for instance, be implemented as a single bit. In order to avoid wasting memory space several logical data elements any be 'packed' into a single word. Readout of information from, and writing of information into, a logical data element, which has been implemented as part of a memory word where the remaining part of the memory word is utilized for other logical data elements will now require a certain amount of processing if it is required that the actual information transferred to and from the CPU 204 on the data bus (DBUS) 208 is to be normalized into a right adjusted form. This processing is performed by means of the mask and shift unit (MSU) 234 in FIG. 15.

Figure 17:
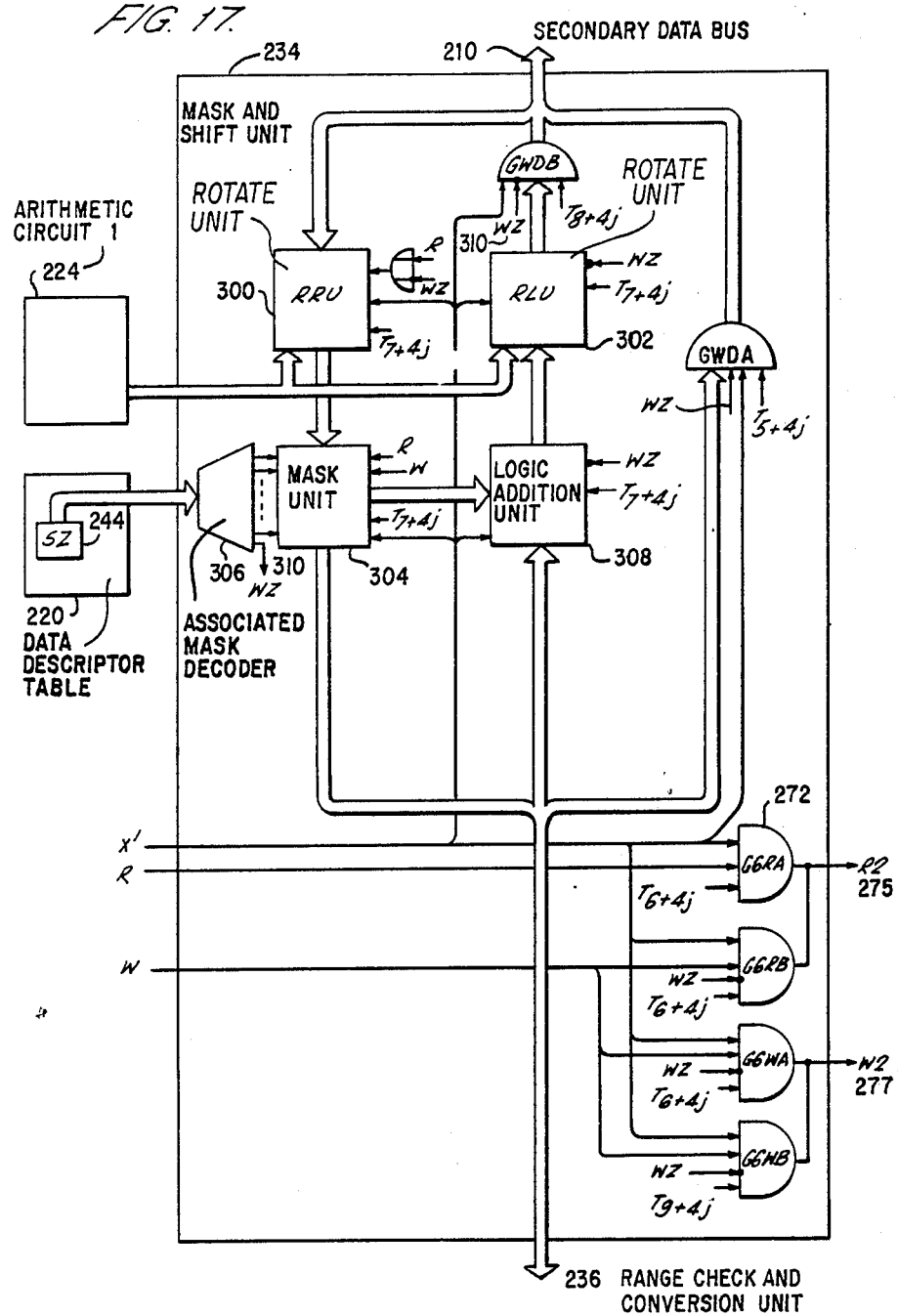
FIG. 17 shows the arrangement of a mask and shift unit.
Figure 18:
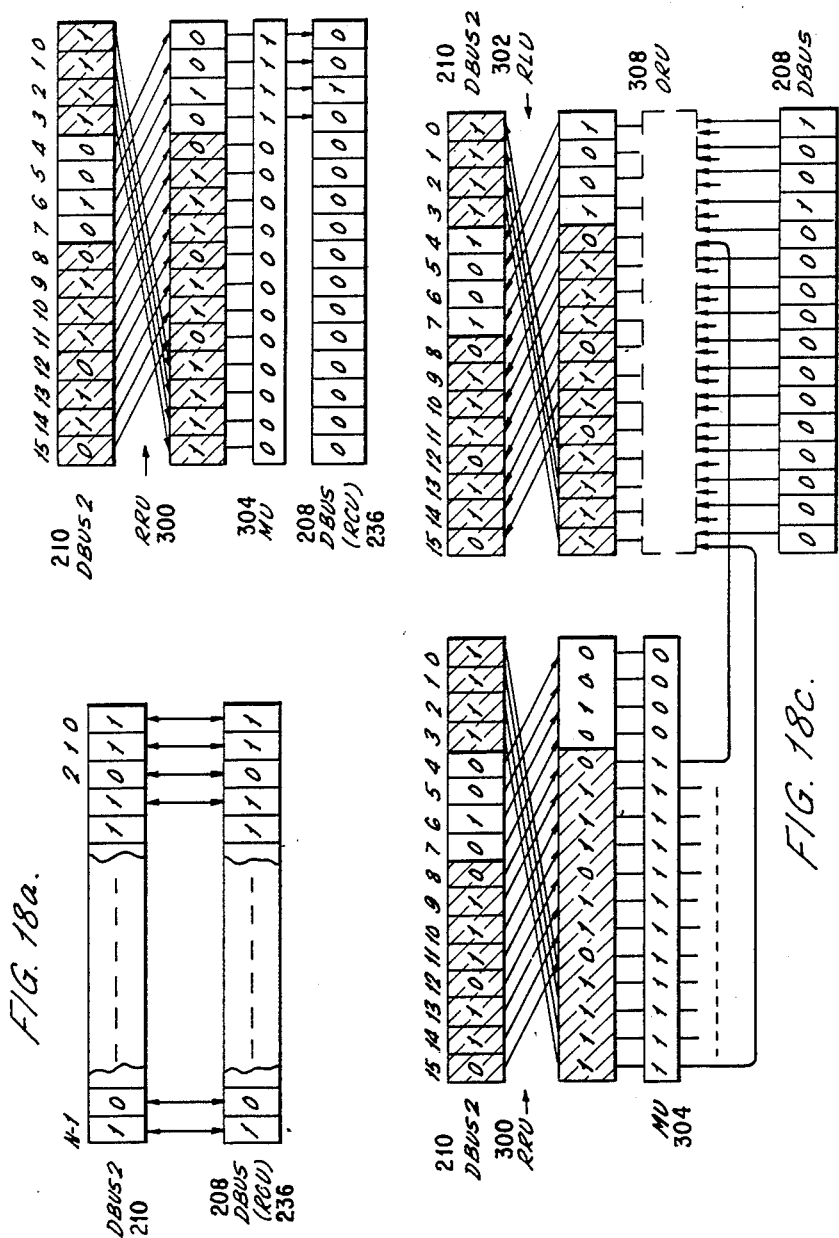
FIGS. 18A, 18B, and 18C describe information transfer in the invention.

The detailed logic of such a mask and shift unit is in itself known and utilized in computing systems and is therefore not in itself a subject of the invention. The way the MSU 234 is controlled is, however, essential for the invention as a whole. FIG. 17 therefore shows a possible logic arrangement for such a mask and shift unit and how this logic interworks with the other parts of the MCU 200.

All logic circuits of the MSU 234 are enabled by the X' signal asserted by the XDEC 232, i.e. the MSU 234 will only operate when the Main Memory is to be accessed from the MCU 200. The MSU 234 in FIG. 17 is shown to consist of 6 control gates (GWDA, GWDB, G6RA, GR6B, G6WA, G6WB), two rotate units (RRU 300 and RLU 302), a mask unit (MU) 104 with associated mask decoder (MDEC) 306 and a logic addition unit (ORU) 308.

When the MCU 200 has completed the virtual to real address translation as described above, and asserted the real memory address on the secondary address bus (ABUS2) 210, then the virtual address decoder (VAD) 221 in FIG. 15 still identifies a particular entry in the Data Descriptor Table (DT) 220. In particular the SZ 244 part of this entry is of importance for the mask and shift unit M3U 234. The SZ 244 part determines the allocated size for the actual data element in the Main Memory 202, i.e. the number of bits to participate in any data transfer, and is asserted as the input to the mask decoder (MDEC) 306 in FIG. 17.

The mask decoder (MDEC) 306 issues a mask bit pattern to the mask unit (MU) 304. This mask bit pattern comprises an entire word as follows:

| | |
|---|---|
| 1 bit data element: | 000 ... 0000001 |
| 2 bit data element: | 000 ... 0000011 |
| 3 bit data element: | 000 ... 0000111 |
| ... | |
| word data element: | 111 ... 1111111 |

In addition the mask decoder also issues a signal (WZ) 310 when the actual data element occupies an entire word in the Main Memory (M) 202, which signal is used as input to the internal control logic in the MSU 234.

The real address issued by the arithmetic circuit (AC1) 224 actually identifies the least significant bit of the data element to be accessed. All Main Memory accesses are word accesses, however. The real address output from AC1 224 is therefore split into two parts as indicated in FIG. 15, the first part forming the address to a memory word within the Main Memory 202 and the second part forming the bit address of the least significant bit of the actual data element within that word. The word address is issued on the secondary address bus (ABUS2) 210. The bit address is used to control the operation of the rotate units (RRU 300 and RLU 302), within the MSU 234.

If the wordlength of the Main 1 memory 202 is a power of two, then the bit address may be directly obtained by means of the binary arithmetic within the arithmetic circuits (AC1 224 and AC2 260). For any other wordlength extra circuitry of in itself known design will be required to accommodate the nonbinary nature of the resulting bit address calculations. In the following examples it will be assumed that the word length of the Main Memory (M) 202 is 16 bit, whereby the bit address within a word will require $\log_2 (16) = 4$ bits.

If a data element occupying an entire memory word is to be read from the Main Memory 202, then the SZ 244 part of the DT 220 entry will indicate 16 bits to participate (=the above assumed word length). The actual mask value generated by MDEC 306 will now be 1111111111111111 and at the same time a valid WZ 310 signal is issued. Because an entire word transfer is indicated, the bit address to the least significant bit of that word will, of necessity, be 0. According to FIG. 16, the actual word address is issued on the secondary address bus (ABUS2) 210 at phase $T_{5+4j}$ and the actual secondary read signal (R2) 275 at phase $T_{6+4j}$ by means of the control gate G6R 272, which in FIG. 17 is represented by the control gate G6RA. At phase $T_{7+4j}$ both the RRU 300 and the MU 104 will be enabled. The rotate unit (RRU) 300 will pass the information from the secondary data bus (DBUS2) 210 directly to the mask unit (MU) 304 without any rotation, because the least significant bit address obtained from the arithmetic circuit (AC1) 224 is 0. The mask unit will, in its turn, also pass the information straight on to the RCU 236, because the actual mask word is 1111111111111111 and the MU 304 is read enabled (R). The principal information transfer is therefore as illustrated by FIG. 18a.

Figure 1:
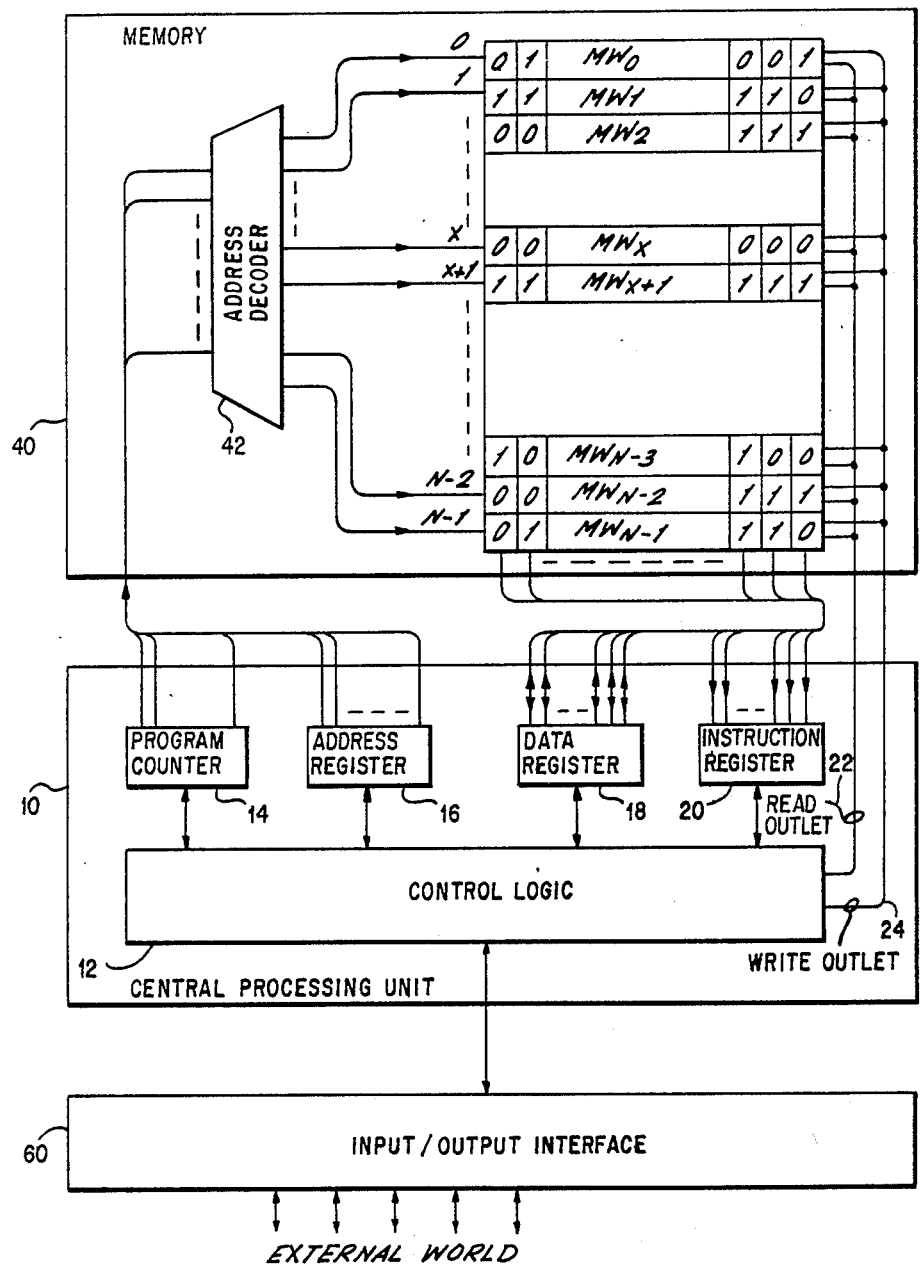
FIG. 1 shows a block diagram of a computing system.
Figure 4:
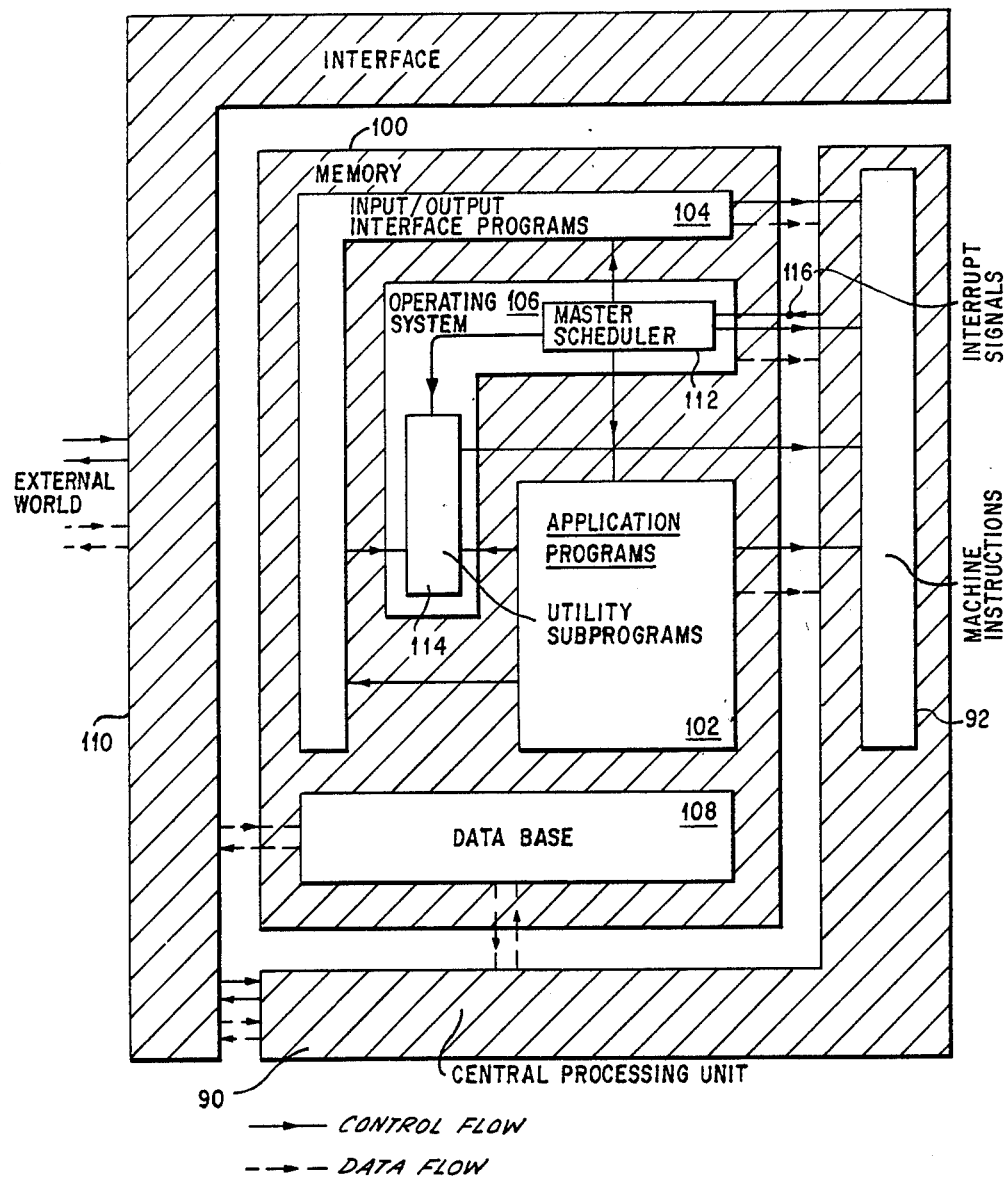
FIG. 4 shows a computer system structure.
Figure 5:
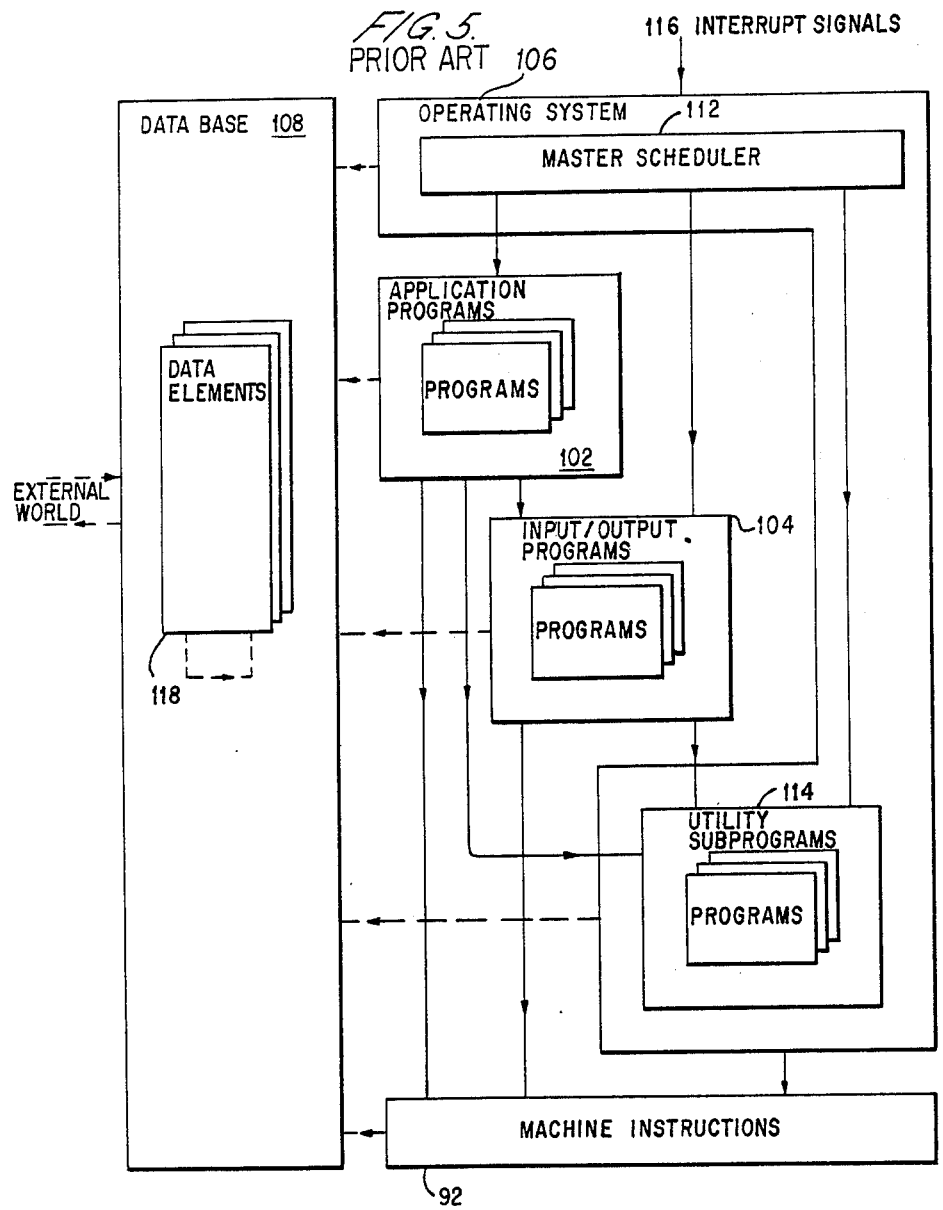
FIG. 5 shows a block diagram of a principal software structure.
Figure 6:
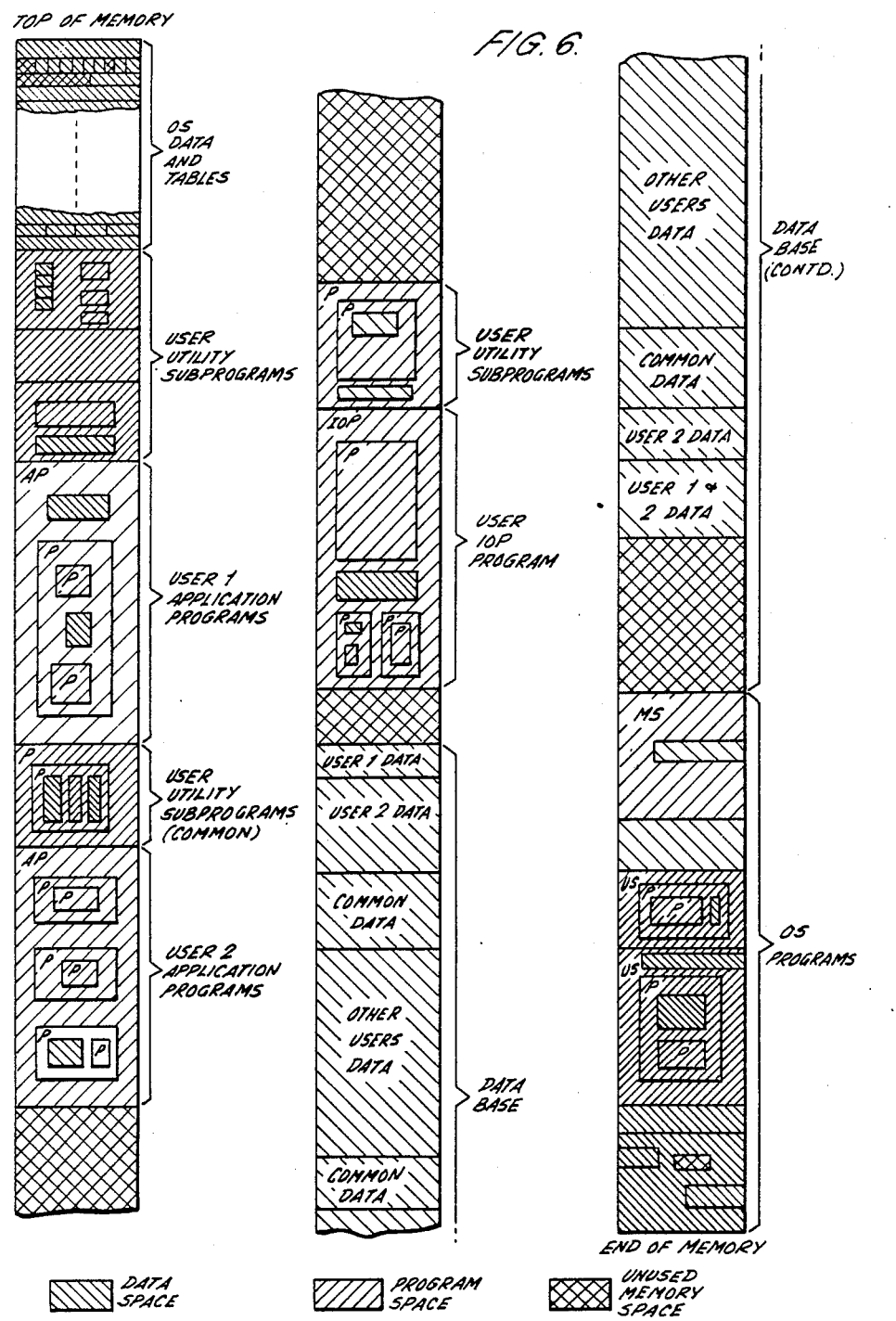
FIG. 6 shows a typical layout of memory.

If instead, information is to be written into a data element occupying an entire memory word, then the information to be written into the memory is obtained from the data bus (DBUS) 208 via RCU 236 at the latest at phase $T_{5+4j}$, i.e. at the same time as the real address is issued on the secondary address bus by the MCU 200. As FIG. 1 shows, the information is gated directly to the secondary data bus (DBUS2) 210 by means of the control gate (GWDA). The secondary write signal (W2) 277 is in this case issued at phase $T_6$ by means of the control gate (G6WA). The principal information transfer in this case also follows the principle in FIG. 18.

If we now assume that the actual data element to be read is a 4 bit data element, which occupies bit position 7-4 in a memory word, then the actual bit address from AC1 224 will be 4 (=actual least significant bit). The corresponding mask word obtained from MDEC 306 will in this case be 0000000000001111.

The principle of information transfer is in this case illustrated by FIG. 18b. After the secondary read signal (R2) 275 has been asserted by means of the control gate (G6RA) the RRU 300 and MU 304 will, similar to the reading of an entire word, be enabled in phase $T_{7+4j}$. However, because the bit address asserted at the input of the rotate unit RRU 300 is 4, the information word obtained from the secondary data bus (DBUS2) 210 will now be rotated four steps to the right. MU 304 will in this case only pass the four least significant bits of the memory word to the primary data bus (DBUS) 208 because of the mask value 0000000000001111. Hence the information passed to the primary data bus will always be right adjusted with leading zeroes as illustrated by FIG. 18b.

Finally, FIG. 18c illustrate the principle of writing into a data element in the Main Memory 202 when the data element occupies less than a memory word. Because the memory operates on a word basis, the entire memory word must, in this case, first be read out, the actual portion of the memory word allocated to the actual data element replaced by the new value of the data element and the entire memory word finally written back into memory. Hence in phase $T_{6+4j}$ the address is asserted on the secondary address bus (ABUS2) 210. At this point AC1 224 asserts the bit address to the least significant bit of the actual data element within the memory word (which data element is still assumed to occupy bit positions 7-4) i.e. the bit address controlling the rotate units is 4. Because the data element is a four bit data element the mask word issued by MDEC 306 will again be 0000000000001111. In phase $T_{6+4j}$ the data to be written will already be available on the input from the primary data bus (DBUS) 208 from the CPU 204 (via the RCU 236) in right adjusted format with leading zeroes. As shown by FIG. 17, a secondary read signal (R2) 275 is now issued by the MSU 234 by means of the control gate G6RB, because the WZ signal from MDEC 306 is not asserted for any less than word length operation. In phase $T_{7+4j}$ all of the units RRU 300, MU 304, ORU 308 and RLU 302 are enabled, RRU 300, RLU 302 and ORU 308 due to WZ not being present and MU 304 due to the presence of the W signal from the CPU 204. Hence the RRU 300 rotates the information obtained from the Main Memory 202 the number of steps indicated by the actual bit address from AC1 224 to the right (in this example 4 steps) in order to right adjust the information. The mask unit (MU) 304 is in this case write enabled, which causes the mask word (0000000000001111) to be inverted (1111111111110000) before it is used, thereby clearing the portion of the information associated with the actual data element. The resulting information is now merged with the information from the RCU 236 in the ORU 308, principally by means of a logical 'OR' operation. Finally the rotate unit (RLU) 302 rotates the information output from ORU 308 the number of steps given by the bit address in AC1 224 to the left. The output from the RLU 302 may now, in phase $T_{8+4j}$, be issued back to the Main Memory 202 on the secondary data bus (DBUS2) 210 by means of the control gate (GWDB) and finally, in phase $T_{9+4j}$, the secondary write signal (W2) 277 is issued by means of the control gate (G6WB).

In order to be able to perform the address translation it must be possible to transfer information from the CPU 204 directly to the index registers of the MCU 200 and vice versa. The mode decoder (MD) 230 in FIG. 15 has an output signal (XR) for this particular purposes. When the XR signal is asserted the normal address translation by means of the arithmetic circuits (AC1, 224 and AC2 260) is inhibited. The XR signal instead enables the index register indicated by the corresponding output code from the XDEC decoder as the origin or destination of the information transfer to or from the CPU 204, depending on whether the CPU has asserted a read (R) signal 207 or a write (W) 209 signal.

The application of the invention will now be illustrated by means of a detailed example. This example consists of a logical data structure, which is specified by the following high level programming language statements:

P is integer 0 to 59,
Q is array (1 to 3) of structure where
A is integer 0 to 1000,
B is integer 0 to 100,
C is integer 100 to 200,
D is array (−3 to −1) of integer 1 to 12
E is array (1 to 24) of array (3 to 5) of integer 0 to 1,
F is integer −500000 to 500000;,
R is array (1 to 3) of integer 0 to 100, The above data structure contains a number of data elements, each one with a given legal value range. The legal values for the data element P are for instance only the integer values 0, 1, 2, ... 58, 59. Similarly, for arrays of data elements, the legal values of the corresponding indices are explicitly specified. Thus legal instances of the data element D are D(−3), D(−2) and D(−1).

Figure 19:
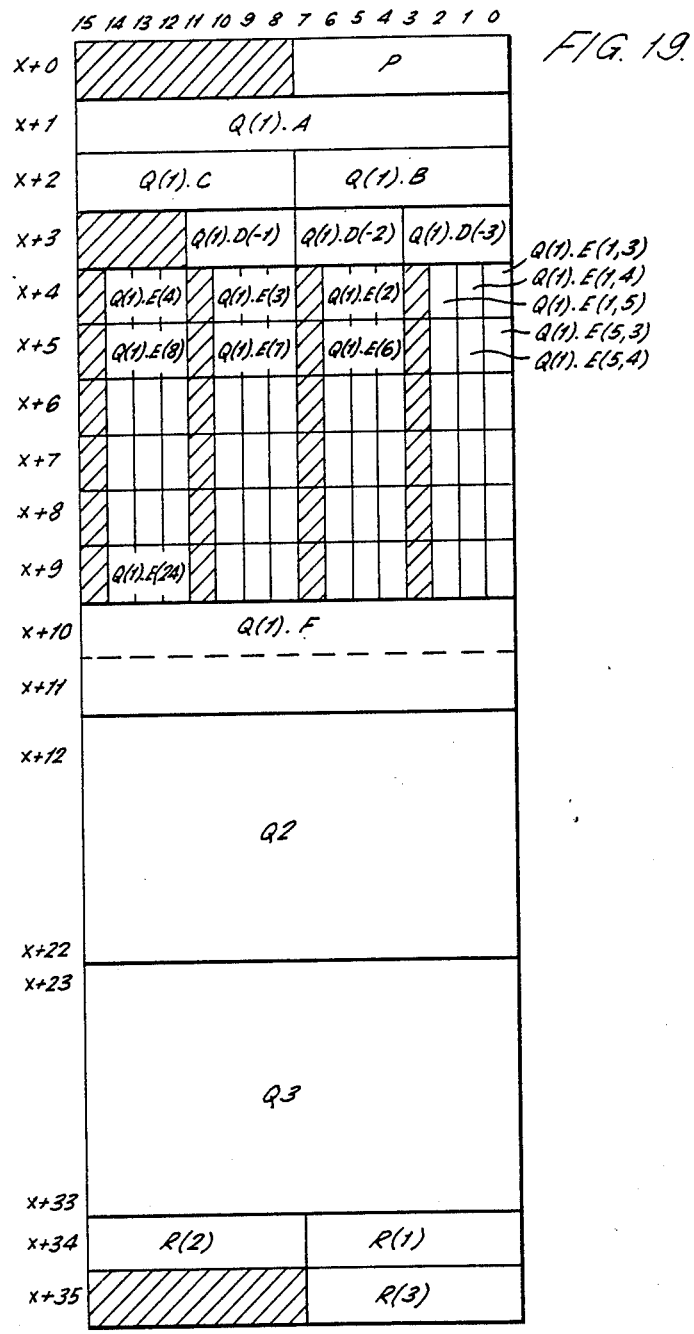
FIG. 19 illustrates a possible allocation of memory space for data elements.

FIG. 19 illustrates a possible way of allocating memory space to the above mentioned data elements. A total of 36 memory words are utilized at the Main Memory addresses X+0, X+1, ... X+35. The first memory word at address X+0 is used to hold the memory element P. The memory words at addresses X+1 to X+33 are allocated to the Q array with the first 11 words (X+1 to X+11) being allocated to the first Q-array element (Q(1)), the next eleven words (X+12 to X+22) to the second Q-array element (Q(2)) and the last eleven words (X23 to X33) allocated to the third and last Q-array element (Q(3)).

Within each Q-array element the first word (X+1 for Q(1), X+12 for Q(2) and X+23 for Q(3)) is allocated to the element A of the corresponding structure. The least significant 8 bits of the second word are allocated to the element B and the 8 most significant bits of the same structure to element C. The third word is allocated to the D array with the first element of the D-array (D(−3)) occupying the 4 least significant bits, the next element of the D-array (D(−2)) occupying the next four bits etc. The E-array occupies the next 6 words. Finally the F-element of the structure occupies the two last words of each Q-array element.

The R array finally is allocated to the two last words (X+34 and X+35, each element of the array occupying 8 bits.

FIG. 20 shows an example of a Data Descriptor Table, which allows the data structure as implemented in FIG. 19 to be accessed. The data element P is allocated the single entry 0 in the table. For P no index register is indicated (XRC 240= —). The Base Address (BA) 242 is specified as X+0 with the bit address of the least significant bit being 0. The number of bits allocated to the data element (SZ) 244 is specified as 8, i.e. the 8 leftmost bits of the memory word are not used as indicated in FIG. 19. The lowest legal value of the data element (LL) 246 is specified as 0 and the total number of legal values (NOV) 248 as 60. When the data element P is to be accessed the CPU 204 now only has to issue the virtual address 0. As previously described with reference to FIGS. 16–18 the MCU 200 will then assert the corresponding real address (X+0) to the Main Memory 202 with the MSU 234 performing any required masking in and out of nonrelevant bits.

Data element A, is replicated as part of each of the elements of the Q array is allocated two table entries (1 and 2), with table entry 1 corresponding to the virtual address being issued by the CPU 204 when accessing A. Table entry 1 indicates the use of the XR0 index register (XRC 240 +XR0). The size of the associated element is given as 176 bits (SZ=176). The LL 246 and NOV 248 entries now indicate the lower limit of the legal index value (LL=1) and the number of elements in the array (NOV=3). Because an index register is indicated the base address element now contains a secondary virtual address (BA=2), pointing to the secondary table entry of the element A. This secondary table entry now holds the start address of the element (BA=X+1) with bit address=0. The size of the accessed element is given as 16 and the limit values as 0 to 1001. Provided that a legal index value is held in the index register XR0 when the CPU 204 issues the virtual address 1 then the real address which will be issued by the CPU 204 will be either X+1, X+12 or X+23 with the actual transfers to be performed on a word basis.

In a similar manner to element A, element B occupies table entries 3 and 4, element C entries 5 and 6, element D (which is a two-dimensional array) entries 7–9, element E (a three-dimensional array) entries 10–13, element F entries 14 and 15 and element R entries 16 and 17, the actual virtual addresses being 3 for B, 5 for C, 7 for D, 10 for E, 14 for F and 16 for G.

FIG. 21 illustrates an alternative way of allocating memory space to the data element P, the structure Q and the array R. The allocation in FIG. 21 is logically equivalent with the allocation in FIG. 19. FIG. 22 shows a corresponding example of an associated Data Descriptor Table. By comparing FIG. 22 with FIG. 20 it can be seen that the virtual addresses associated with each data element do not change.

A Master Control Unit (MCU) 200 according to the invention thus makes it possible to completely separate the physical layout of the data structures allocated in the memories from their logical function.

An MCU 200 according to the invention may function without a range check and conversion unit (RCU) 236. This simply means that the RCU 236 shown in FIG. 15 will be shortcircuited, i.e. the data bus from the CPU 204 (DBUS) 208 is to be directly connected to the MSU 234 and the index registers of the MCU 200 (XR0−XRQ). The LL 246 and NOV 248 entries in the Data Descriptor Table will then, of course have no function at all. Operating the MCU 200 without an RCU 236 sets certain restrictions, however. The function of the RCU 236 is to ensure that all values transferred to and from the CPU 204 are within their legal value ranges as seen from the CPU 204, while at the same time store these values in their most efficient form in the memory. An RCU 236, which is able to perform these functions is described in the U.K. patent application No. 8334079.

The memory allocation examples shown in FIGS. 19 and 21 in fact postulate the existence of such an RCU 236 as will be explained below.

The data element D forms an array with three elements inside each element of the structure Q. Each individual D element may thereby take any of the values 1–12 according to the logical specification of the element. Each D element is furthermore identified by an index with the logical value −3, −2 or −1. The logical values of the index to a Q element are correspondingly 1, 2 or −3. The CPU 204 always operates with these logical values. However, when FIGS. 19 and 21 are examined in combination with the described logic of the MCU 200, it can be seen that the MCU 200 needs to operate on normalized index basis, where the first element is associated with index value 0, the second element with index value 1, etc. Hence, a logical to physical index translation is necessary to translate the logical Q-indices 1–3 into their normalized 0–2 counterparts as well as the logical D-indices −3−−1 into their normalized 0–2 counterparts.

Without the RCU 236 there are basically three options available:
 (a) Programming both the translation and necessary range checks explicitly.
 (b) Enable the logical indices to be directly used by allocating space for all nonused index values in the arrays.
 (c) Restrict the programmers to use only normalized index values in their programming.

None of the above options manages to completely eliminate the previously mentioned cross purpose memory accessing errors. However, with an MCU 200 as described above and a range check and conversion unit (RCU) 236 as described in the above mentioned patent application cross purpose memory accessing errors may be completely eliminated, thus considerably enhancing the security of the associated systems.

Assume our previously specified logical data structure:
P is integer 0 to 59,
Q is array (1 to 3) of structure where
 A is integer 0 to 1000,
 B is integer 0 to 100,
 C is integer 100 to 200,
 D is array (−3 to −1) of integer 1 to 12,
 E is array (1 to 24) of array (3 to 5) of integer 0 to 1,
 F is integer −500000 to 500000;
R is array (1 to 3) of integer 0 to 100,
which structure may be implemented in a 16 bit memory as illustrated in FIGS. 19 and 21.

Let us further assume that the following logical operation is to be performed on the data elements of this data structure:

R(2):=Q(2) B or, in other words, the value held in element B of the second instance of structure Q is to be transferred to the second instance of element R. With reference to FIG. 19 the 8 least significant bits of the memory word at address X+13 have to be read and the contents transferred to the 8 most significant bits of the memory word at address X+34. In the implementation according to FIG. 21 the contents of the 8 most significant bits of the memory word at address X+4 are to be transferred to the 8 most significant bits of the memory word at address X+34.

With an MCU 200 according to the invention this operation may now be performed by executing the following machine instructions in the CPU 204, assuming the same kind of CPU 204 as described in the introduction :
 SD 2, @AR+(MOD=XR, OFFSET=3)
 LD DR, @AR+(MOD=none, OFFSET=3)
 SD 2, 2AR+(MOD=XR, OFFSET=16)
 SD DR, @AR+(MOD=none, OFFSET=16)

The first SD instruction issues a virtual address on the address bus (ABUS) 206 in FIG. 14. This virtual address consists of the mode indicator and the Data Descriptor Table entry identity. The mode indicator indicates and index register, i.e. the mode decoder (MD) 230 in FIG. 15 will now issue an XR signal as has been previously described. The virtual address decoder will now identify the entry in the Data Descriptor Table specified by the Offset part of the virtual address, i.e. table entry 3. Table entry 3 indicates index register XR0 in its XRC 240 field. Because the XR signal is issued from the mode decoder (MD) 230, the normal address translation is inhibited, i.e. the destination or origin of any data transfer from the CPU 204 will now be the index register XR0 of the MCU 200. Because the actual instruction is an SD instruction (Store Data), the CPU 204 issues an write signal (W) 209 to the MCU 200, i.e. the logical index value 2 given an operand of the SD instruction is to be transferred into index register XR0 of the MCU 200. This transfer is performed via the RCU 236, however. The RCU 236 will thereby perform a range check and conversion, utilizing the LL 246 and NOV 248 values of table entry 3 in the manner described in the associated patent application. As a result of this range conversion, the value actually stored in XR0 will be the (logical value − the LL − value) or 2 − 1 = 1, thereby normalizing the index value inside the range 0–2 in this particular case.

When the LD instruction is executed by the CPU 204, the virtual address with offset=3 will be issued on the address bus (ABUS) 206 without any modification. If the Data Descriptor Table in FIG. 20 is used then the address will be translated by the MCU 200 as SZ(3)*XR0 +BA(BA(3)) =1*176 +BA(4)=11//0+X+2//0=X+13//0, i.e. the real word address issued on the secondary address bus 210 will be X+13 with the bit address issued to the MSU 234 being 0 and the data length being 8. The 8 least significant bits of the addressed memory word will thus be read. If instead the Data Descriptor Table of FIG. 22 had been used then the address would have been translated as SZ(3)*XR0+BA(BA(3))=1*8-+BA(4)=0//8+X+4//0=X+4//8, i.e. the real word address issued on the secondary address bus (ABUS) 210 would have been X+4 with the 8 most significant bits of the word to be read.

The RCU 236 will, in both cases, check that the value held by the 8 transferred bits are within the range 0–100, i.e. the value eventually transferred back to and held in the DR register of the CPU 204 will always be an in-range value.

The two last SD instructions follow the same pattern i.e. the first transfer the logical index value 2 to the index register XR1 of the MCU 200, which value is normalized by the RCU 236 to the value 1 before stored in XRI, and the second one translates the virtual address (offset 16) into the physical memory address X+34//8.

Without the invention the address calculations would have to be explicitly performed including any necessary range checking and conversions. A possible example of code without the MCU 200 equivalent in function to the two first instructions with the MCU 200 generated by the statement:

R(2):=Q(2) B could, for instance be:

| | |
|---|---|
| LD DR0,2 | - Load logical index value |
| SUB DR0,1 | - Normalize index value |
| ... | - Eventual range checking<br>- code |
| MUL DR0,76 | - Multiply index value by<br>- size of array element |
| LD DR1,DR0 | - Copy DR0 to DR1 |
| AND DR1,&HOOOF | - Mask Bit Address within<br>- word |
| SHR DR0,4 | - Form word index |
| LD DR2,@AR+DR1 | - Load word from memory<br>- into DR2 |
| SHR DR2,DR1 | - Shift correct bit<br>- position of data |
| LD DR3,@MASKWORD+(DR1) | - Load actual Mask word |
| AND DR2,DR3 | - Mask actual bits |
| ... | - Eventual range checking<br>- code<br>- At this state DR2 holds<br>- the actual information |

With an MCU 200 according to the invention a considerable reduction in the complexity and amount of code required for the CPU 204 will thus be obtained with a corresponding reduction in program volumes. Secondly it should be evident that the translation of high level language programs into machine code will be equally simplified, leading to much simpler and more efficient compilers.

What is claimed:

1. A computer comprising central processor means which operates upon and issues commands using virtual addresses;

main memory means for storing information in binary form as data elements, the elements being accessed by the use of real addresses; and master controller means coupled to the processor means and the main memory means, the controller comprising a plurality of internal index register means and a data descriptor table means, the table means having at least one table entry means for each individually accessible data element in the main memory, each table entry means having at least three elements for translating virtual addresses to real addresses, the first of which elements indicates which, if any, of the index register means is needed for a translation, the second element of which permits either the starting address in the main memory to be specified when no index register means participates in the address translation or a secondary table entry to be indicated when an index register means participates in the address translation, the third element permitting either the size of the element to be accessed to be specified when no index register means participates in the address translation or the size of the element to participate in an index multiplication to be specified when an index register means does participate, the controller means translating virtual addresses received from the processor means to real addresses for use by the memory means without instructions from the processor means using address calculation or index multiplication.

2. The computer of claim 1, wherein the master controller means further comprises two decoder means, the first of which allows either one of the index register means to be selected or not and the second of which either allows the processor to control the master controller or not; and two arithmetic circuit means, the first of which multiplies the contents of the index register means indicated by the first decoder means times the contents of the third element of the table entry means currently indicated and adds the resulting value to the result of the previous index multiplication within the same address translation, and the second of which either adds the start address in the second element of the table entry means currently indicated to the result of the multiplication of the first arithmetic circuit means if no index register means is indicated by the first element in the table entry means or causes the address translation to be continued in a cumulative fashion with the table entry indicated by the second element of the current description table entry means.

3. The computer of claim 2 wherein the sum obtained by the second arithmetic circuit means comprises a real address in the memory means.

4. The computer of claim 2 wherein the master controller means is further comprised of a mask and shift unit means, the mask and shift unit means normalizing data to be sent to the central processor means into right-justified form.

5. The computer of claim 4, wherein the sum obtained by the second arithmetic circuit is a real address, said real address being a bit address to a bit with an identified bit position within a data element stored in the main memory.

6. The computer of claim 5 wherein the real address is comprised of a word address part and a bit address part, the word address part being used by the master controller means to access a memory word in the memory means and the bit address part together with the size of an element specified by the third element of the table entry means currently indicated being used to control the mask and shift unit within the controller means, the mask and shift unit operating in such a manner that any information transferred from the memory means to the processor means is presented to the processor means in an adjusted format with filled-in zeroes regardless of the bit positions of a particular data element within an actual memory word in the memory means and any information transferred from the processor means to the memory means is presented first to the mask and shift unit in the same adjusted format, with or without filled-in zeroes, and the mask and shift unit automatically inserts all relevant bits into the correct bit positions within the memory word addressed in the memory means.

7. The computer of claim 6 wherein the identified bit position is the last significant bit.

8. The computer of claim 6 wherein the identified bit position is the most significant bit.

9. The computer of claim 6 wherein the format is right-adjusted with leading zeroes filled in.

10. The computer of claim 6 wherein the format is left adjusted with lagging zeroes filled in.

11. The computer of claim 4 wherein the master controller means is further comprised of a third arithmetic circuit means, which third arithmetic circuit means is used to modify the values held in any of the index register means before, during, or after an address translation.

12. The computer of claim 11, further comprising a range check and conversion unit coupled to the processor means, the master controller means now being coupled to the conversion unit, the conversion unit allowing the data values to be used in their natural values within the processor means and to be stored and operated in both master controller means and memory means with normalized values for most efficient storage and performance utilization, each normalized value corresponding to a unique natural value.

* * * * *